United States Patent
Schulz et al.

(10) Patent No.: US 9,070,104 B2
(45) Date of Patent: *Jun. 30, 2015

(54) CROSS-CONTEXT TASK MANAGEMENT

(75) Inventors: Karsten A Schulz, Middle Park (AU); Wasim Sadiq, Westlake (AU)

(73) Assignee: SAP SE, Walldorf (DE)

( * ) Notice: Subject to any disclaimer, the term of this patent is extended or adjusted under 35 U.S.C. 154(b) by 2390 days.

This patent is subject to a terminal disclaimer.

(21) Appl. No.: 11/019,480

(22) Filed: Dec. 21, 2004

(65) Prior Publication Data

US 2006/0106846 A1    May 18, 2006

Related U.S. Application Data

(60) Provisional application No. 60/627,350, filed on Nov. 12, 2004.

(51) Int. Cl.
*G06F 7/00* (2006.01)
*G06F 17/30* (2006.01)
*G06Q 10/10* (2012.01)

(52) U.S. Cl.
CPC ..................................... *G06Q 10/10* (2013.01)

(58) Field of Classification Search
None
See application file for complete search history.

(56) References Cited

U.S. PATENT DOCUMENTS

| | | | |
|---|---|---|---|
| 6,002,396 A | 12/1999 | Davies | |
| 6,578,006 B1 | 6/2003 | Saito et al. | |
| 6,678,714 B1 | 1/2004 | Olapurath et al. | |
| 6,970,844 B1* | 11/2005 | Bierenbaum | 705/39 |
| 7,020,618 B1 | 3/2006 | Ward | |
| 7,093,259 B2 | 8/2006 | Pulsipher et al. | |
| 7,117,500 B2 | 10/2006 | Pulsipher et al. | |
| 7,299,466 B2 | 11/2007 | Pulsipher et al. | |
| 7,370,282 B2 | 5/2008 | Cary | |
| 7,428,495 B2 | 9/2008 | Dhar et al. | |
| 8,302,096 B2 | 10/2012 | Schulz et al. | |
| 2001/0044738 A1 | 11/2001 | Elkin et al. | |
| 2002/0143949 A1* | 10/2002 | Rajarajan et al. | 709/226 |
| 2003/0120701 A1 | 6/2003 | Pulsipher et al. | |
| 2003/0120708 A1 | 6/2003 | Pulsipher et al. | |
| 2003/0120709 A1 | 6/2003 | Pulsipher et al. | |
| 2003/0135559 A1* | 7/2003 | Bellotti et al. | 709/206 |
| 2004/0078258 A1* | 4/2004 | Schulz et al. | 705/9 |
| 2004/0078547 A1* | 4/2004 | David et al. | 712/1 |
| 2004/0133889 A1* | 7/2004 | Colle et al. | 718/100 |
| 2004/0230466 A1* | 11/2004 | Davis et al. | 705/8 |
| 2004/0244003 A1* | 12/2004 | Perfetto et al. | 718/100 |
| 2005/0125274 A1* | 6/2005 | Nastacio et al. | 705/8 |

(Continued)

OTHER PUBLICATIONS

"U.S. Appl. No. 11/019,601, Response filed May 1, 2012 to Non Final Office Action mailed Feb. 1, 2012", 11 pgs.

(Continued)

*Primary Examiner* — Wilson Lee
*Assistant Examiner* — Raheem Hoffler
(74) *Attorney, Agent, or Firm* — Schwegman Lundberg & Woessner, P.A.

(57) ABSTRACT

A method and system to manage tasks are described. The method may provide a graphical user interface to allow a user to identify a first task context and associate a plurality of first tasks with the first task context, and to identify a second task context and associate a plurality of second tasks with the second task context. The method may associate at least one of the plurality of first tasks with at least one of the plurality of second tasks. Accordingly, tasks in different contexts and sourced from different applications may be managed.

31 Claims, 18 Drawing Sheets

(56) References Cited

U.S. PATENT DOCUMENTS

| | | | |
|---|---|---|---|
| 2005/0159968 A1* | 7/2005 | Cozzolino | 705/1 |
| 2005/0229151 A1* | 10/2005 | Gupta et al. | 717/101 |
| 2006/0010418 A1* | 1/2006 | Gupta et al. | 717/101 |
| 2006/0085790 A1 | 4/2006 | Hintermeister et al. | |
| 2006/0107265 A1 | 5/2006 | Schulz et al. | |
| 2007/0156483 A1* | 7/2007 | Peters | 705/8 |
| 2008/0250316 A1* | 10/2008 | Zhang et al. | 715/708 |

OTHER PUBLICATIONS

"U.S. Appl. No. 11/019,601, Advisory Action mailed Apr. 21, 2010", 3 pgs.

"U.S. Appl. No. 11/019,601, Final Office Action mailed Feb. 18, 2010", 11 pgs.

"U.S. Appl. No. 11/019,601, Non Final Office Action mailed Feb. 1, 2012", 12 pgs.

"U.S. Appl. No. 11/019,601, Non Final Office Action mailed Aug. 3, 2009", 14 pgs.

"U.S. Appl. No. 11/019,601, Notice of Allowance mailed Jun. 28, 2012", 14 pgs.

"U.S. Appl. No. 11/019,601, Response filed Apr. 9, 2010 to Final Office Action mailed Feb. 18, 2010", 11 pgs.

"U.S. Appl. No. 11/019,601, Response filed Oct. 21, 2009 to Non Final Office Action mailed Aug. 3, 2009", 15 pgs.

\* cited by examiner

CROSS-CONTEXT TASK MANAGEMENT

CLAIM OF PRIORITY

The present application claims priority to U.S. Provisional Application Ser. No. 60/627,350, filed Nov. 12, 2004, the contents of which is incorporated herein by reference.

TECHNICAL FIELD

An embodiment of the present invention relates generally to the field of computerized task management. In particular, the invention relates to a method and system to manage tasks.

BACKGROUND TO THE INVENTION

Computerized task management systems are well known. Systems such as Microsoft Outlook are commonly used to create and manage tasks, email, contacts or the like. However, in these prior art systems each task or email is an independent entity and although tasks may be defined as being of the same category, such a categorization is merely a tag or identifier and provides no additional functionality in processing tasks. In order to perform an operation on a task (e.g., delete a task or mark a task as completed) a user must select that specific task and then perform the operation. The operation is then performed only on the selected task.

SUMMARY OF THE INVENTION

In accordance with an aspect of the invention, a method and system is provided that comprises providing a graphical user interface to allow a user to identify a first task context and associate a plurality of first tasks with the first task context, and to identify a second task context and associate a plurality of second tasks with the second task context. The method may associate at least one of the plurality of first tasks with at least one of the plurality of second tasks. An operation on a task in one task context may be automatically performed on a related or associated task in another task context.

The invention extends to a machine-readable medium embodying instructions that, when executed by a machine, cause the machine to implement the methods and system.

Other features will be apparent from the accompanying drawings and from the detailed description that follows.

BRIEF DESCRIPTION OF THE DRAWINGS

An exemplary embodiment of the invention is now described, by way of example, with reference to the accompanying diagrammatic drawings in which like reference numerals refer to the same or similar features unless otherwise indicated.

In the drawings.

DETAILED DESCRIPTION

A method and system to create and manage tasks in an exemplary computer-based task management system are provided. In the following description, for purposes of explanation, numerous specific details are set forth in order to provide a thorough understanding of the present invention. However, it will be evident to a person of ordinary skill in art that the invention may be practiced without these specific details.

Figure 1:
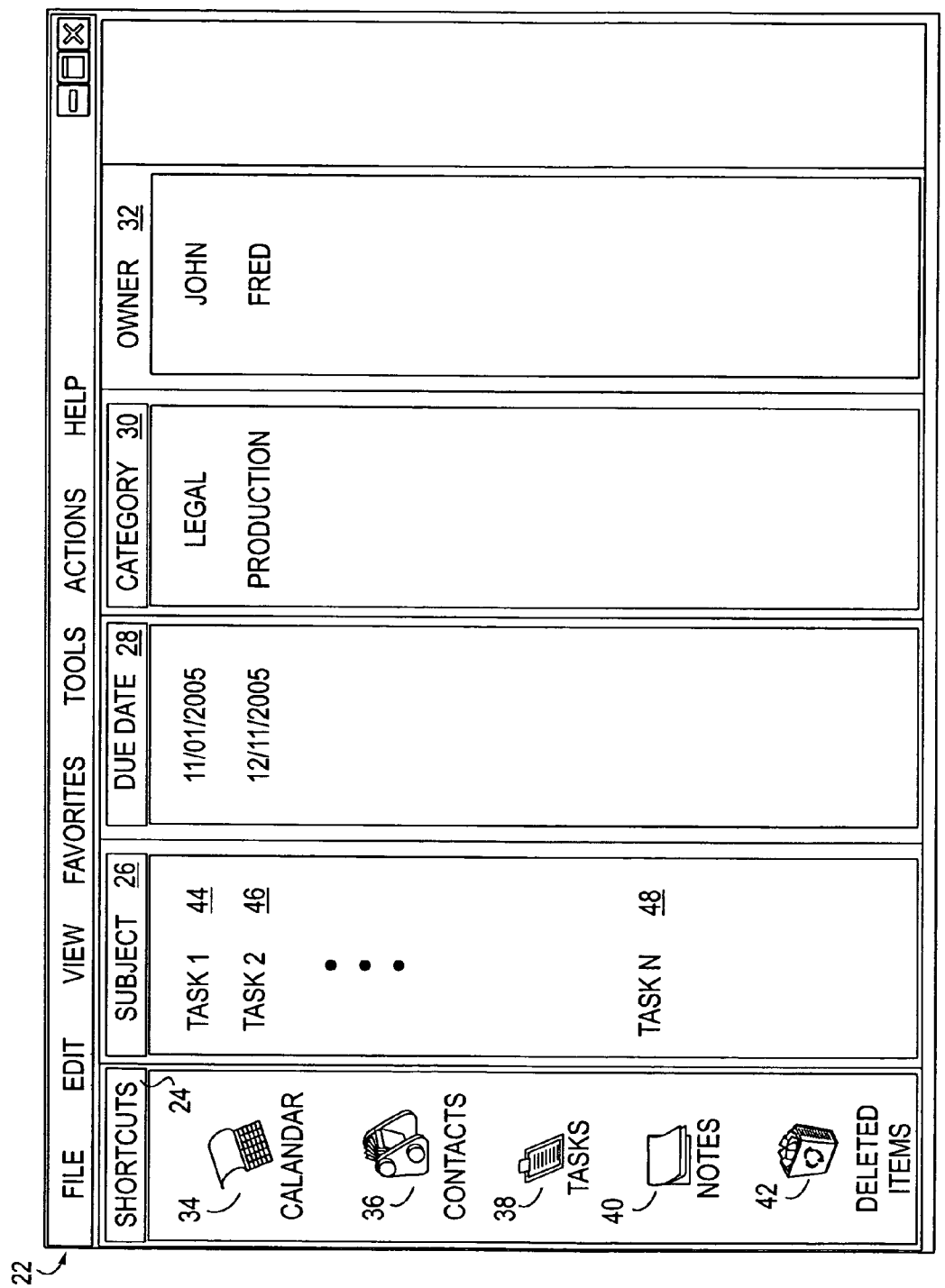
FIG. 1 shows a graphical user interface of a prior art task management system.

Referring to FIG. 1 of the drawings, reference 20 generally indicates a graphical user interface of a prior art task management system. The graphical user interface 20 includes a toolbar 22 with a plurality of dropdown menus to allow a user to manage tasks entered into the prior art task management system. The toolbar 22 includes a FILE dropdown menu, an EDIT dropdown menu, a VIEW dropdown menu, a FAVORITES dropdown menu, a TOOLS dropdown menu, an ACTIONS dropdown menu, and a HELP dropdown menu. Typically, the graphical user interface 20 includes a plurality of columns such as a SHORTCUTS column 24, a SUBJECT column 26, a DUE DATE column 28, a CATEGORY column 30 and an OWNER column 32. The SHORTCUTS column 24 may include a calendar icon 34, a contacts icon 36, a tasks icon 38, a notes icon 40, and a deleted items icon 42. The SUBJECT column 26 may list a plurality of independent and functionally distinct tasks 44, 46, 48. Data provided in the DUE DATE column 28, CATEGORY column 30 and OWNER column 32 may relate to their associated tasks 44,

46, 48. However, in the prior art task management system, the tasks are independent and unrelated. Thus, for example, performing a delete operation on a first task 44, in no way affects a second task 46 or any of the other tasks 48. As the tasks 44, 46, 48 are independent and functionally distinct tasks, any selected operation that is performed on a single task 44, 46, 48 is performed on a single selected task (e.g., first task 44) only and all other tasks (e.g., tasks 46, 48) remain unaffected by the operation. Further, detail provided in the category column 30 e.g. "legal" associated with the first task 44, "production" associated with the second task 46 and so on, are merely descriptive of the task and are not active links or fields.

Figure 2:
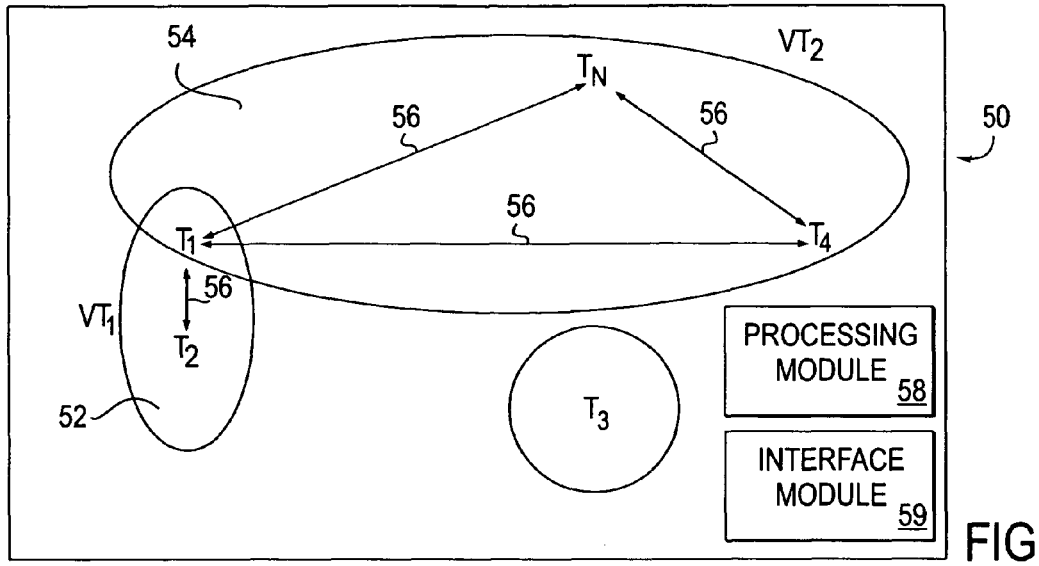
FIG. 2 shows a task management system, in accordance with an exemplary embodiment of the invention, including composite or virtual tasks.

Referring in particular to FIG. 2, reference numeral 50 generally indicates a task management system, in accordance with an exemplary embodiment of the invention, including a plurality of composite or virtual tasks (VT). Virtual or composite tasks are associated with individual tasks (e.g., tasks $T_1$ to $T_N$) so that, any operation performed on a virtual task is also performed on all individual tasks associated with the virtual or composite task. In FIG. 2, an exemplary virtual task 52 ($VT_1$) is shown to comprise individual task $T_1$ and individual task $T_2$ which are associated as shown by arrow 56. Thus, in one embodiment, a operation performed on virtual task 52 (e.g., a delete operation, mark task as completed operation etc.) is also performed in an automated fashion, without further user action, on individual tasks $T_1$ and $T_2$. Further, in the exemplary system 50, a virtual task 54 ($VT_2$) is shown to be associated with individual tasks $T_1$, $T_4$ and $T_N$. The association between the tasks is shown by arrows 56 and, in use, should a user via a graphical user interface execute an operation on the virtual task 54, the same operation would automatically be performed on each of the individual tasks $T_1$, $T_4$ and $T_N$. Thus a plurality of tasks may be grouped or associated and treated as a single (virtual) task. For example, if the virtual task 54 is completed and a user performs a mark as completed operation on the virtual task 54, then each individual task $T_1$, $T_4$ and $T_N$ is also marked as completed. As described in more detail below, the system 50 generates various graphical user interfaces to allow a user to select or define which individual tasks should be grouped or associated with a virtual task. The association between the tasks may be based on hierarchical, temporal, constraint or any other factors or criteria.

The system 50 may include any number of individual tasks and/or virtual tasks in various combinations. For example, individual task $T_1$ may form part of both virtual task 52 and virtual task 54. It will be appreciated that a plurality of virtual tasks may be grouped or associated and, any combination of individual tasks and virtual tasks may be grouped or associated with a further virtual task. Individual task $T_3$ is an example of an individual task that has not been associated with any other task.

An example of a virtual or composite task is a leave request task. For example, virtual task 54 may be a leave request task comprising a plurality of individual tasks each of which are associated with a leave request by an employee (e.g., an email from an employee requesting leave or vacation time). Thus, instead of processing each individual request by an employee individually, the individual requests (e.g., tasks $T_1$, $T_4$ and $T_N$) may be grouped into the virtual task 54 and a manager may then process all leave requests as a single operation or task. If the manager approves the virtual task 54 then each individual leave request $T_1$, $T_4$, $T_N$ is automatically approved without any further action or input from the manager. Accordingly, the user (e.g., the manager) may not only group or associate individual tasks but may also batch process multiple tasks in a single operation.

Each individual task may be a conceptual abstraction of work to be done in order to achieve a defined goal. For example, in one exemplary embodiment each individual task consists of a set of propriety fields which give detailed information about the individual task (activity). Task dependencies or associations (see arrows 56) may relate any two or more tasks and identify their dependency or association. In one exemplary embodiment of the invention, individual tasks from various sources can have attributes and a user may associate an individual task with other individual or composite tasks based on its attributes. Two or more individual or composite tasks may be associated based on diverse attributes or corresponding attributes. It will be appreciated that any user or system defined criteria may be used to define an attribute. For example, a start date attribute for a start date of a task may be defined, an end date attribute for an end date of a task may be defined, a priority attribute or any other attributes may be defined.

The functionality described above may, for example, be performed by a processing module 58 and a interface module 59. For example, the processing module 58 may automatically execute a selected operation on all tasks forming part of a virtual or composite task when an operation is performed on the associated composite task. The interface module 59 may generate graphical user interfaces and interface the system 50 to other task management systems and sources of tasks.

Figure 3:
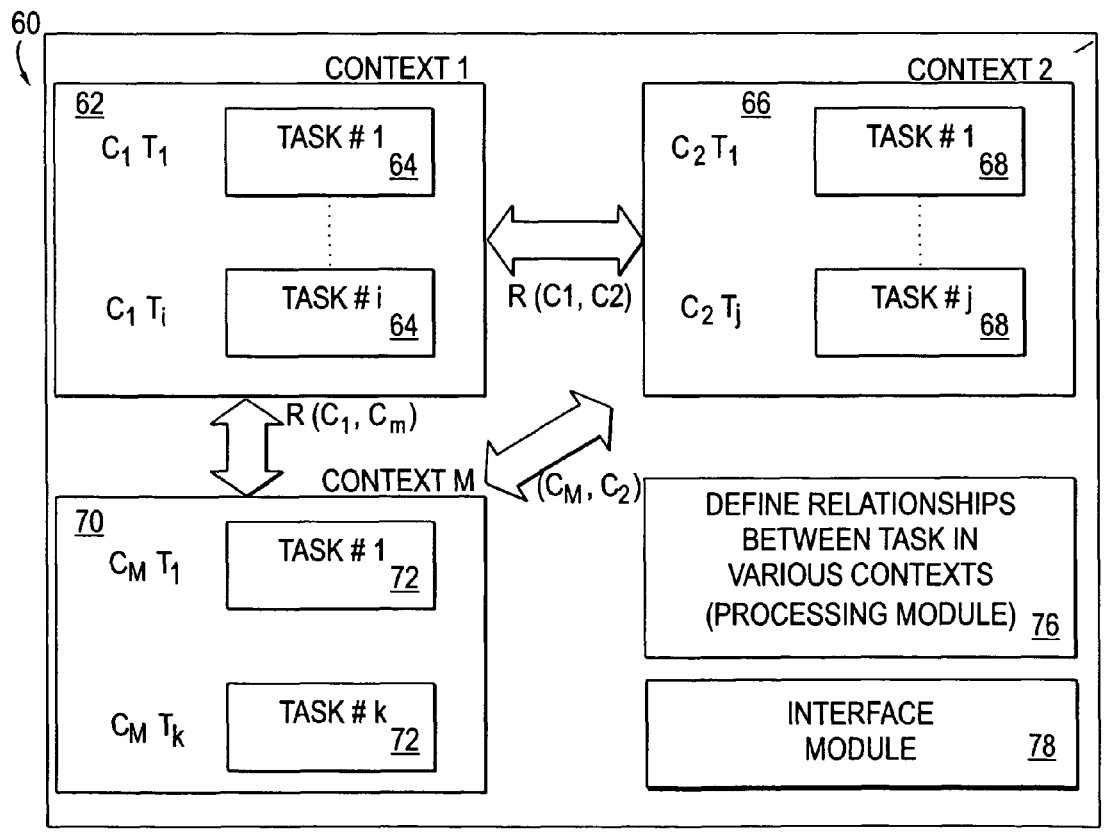
FIG. 3 shows an exemplary cross-context task management system, also in accordance with the invention.

Referring to FIG. 3, reference numeral 60 generally indicates an exemplary cross-context task management system, also in accordance with the invention. The system 60 includes a plurality of different task contexts (e.g., legal context, technical context, administrative context or any other context) which may be associated or grouped. For example, the system 60 is shown to include a first task context 62 including a plurality of individual or atomic tasks 64), a second task context 66 (including a plurality of individual tasks 68), and an $M^{th}$ task context 70 (including exemplary individual tasks 72). A processing module in the exemplary form of a relationships module 76 is provided to define relationships between tasks in the various task contexts 62, 66 and 70. An interface module 78 may generate graphical user interfaces to allow manipulation or management of the tasks by a user as well as to allow interfacing the system 60 to other task management systems and sources of tasks.

In the exemplary system 60, the first context 62 is shown to be associated with the second context 66 based on an exemplary relationship defined as $R(C_1, C_2)$. Any individual task 64 in the first context 62 ($C_1T_i$) may have one or more associated or related individual tasks 68 in the second context 66 ($C_2T_j$). Likewise, tasks in the $M^{th}$ task context 70 ($C_MT_k$) may be associated or related to tasks in both the first context 62 and the second context 66. Further, the tasks 64, 68 and 72 may be individual tasks and/or virtual tasks as described above with reference to FIG. 2.

Figure 4:
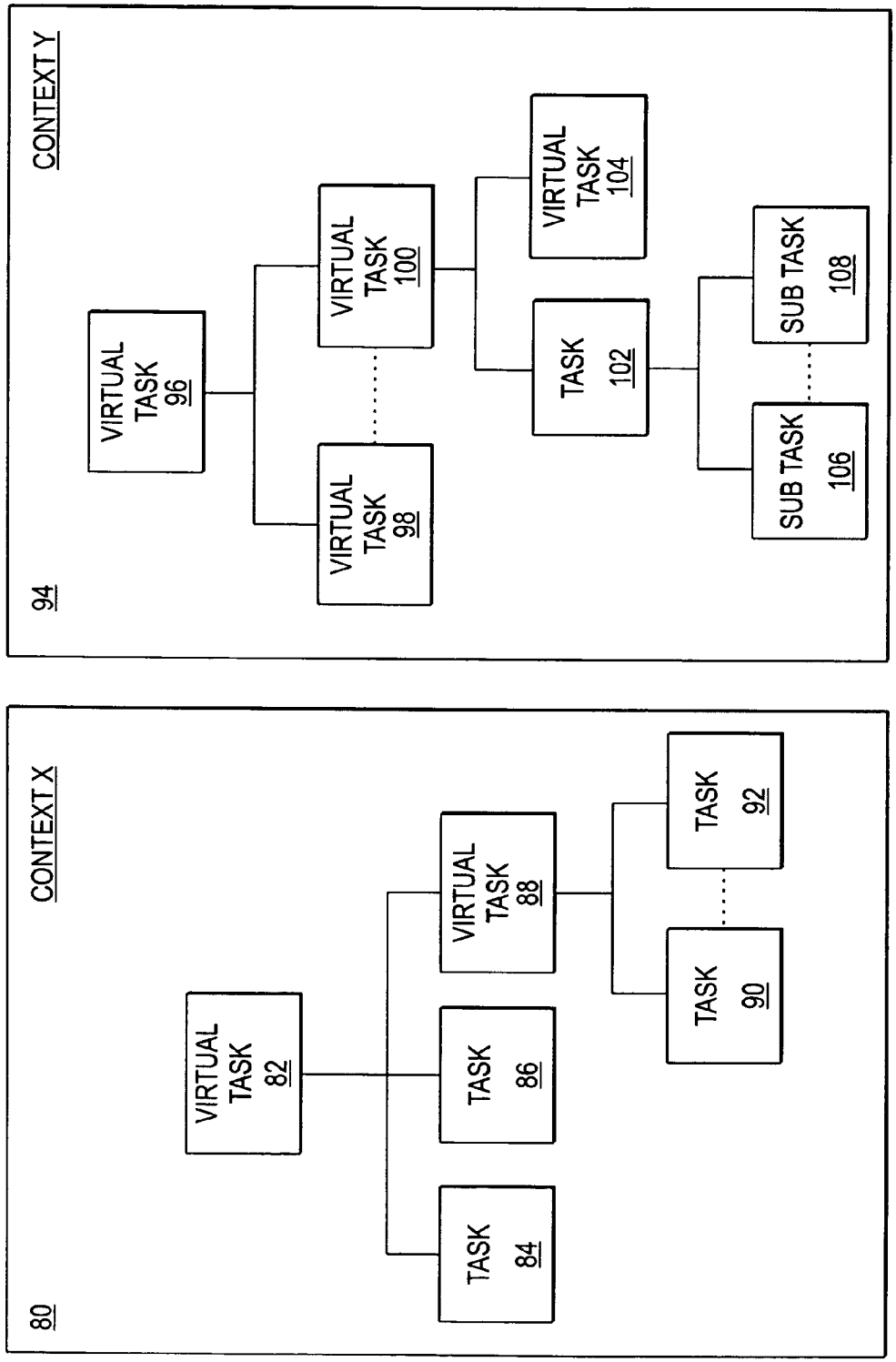
FIG. 4 shows exemplary combinations of various virtual tasks and individual tasks of the cross-context task management system of FIG. 3.

FIG. 4 shows further exemplary composite or virtual tasks and individual tasks that may form part of an exemplary context X 80 and an exemplary context Y 94. In the context X 80, a virtual task 82 is shown to include individual tasks 84, 86 and a virtual task 88. The virtual task 88 may, in turn, be associated with or include individual tasks 90-92. In the context Y 94, a virtual task 96 is shown to include virtual tasks 98-100. The virtual task 100 is shown to include an individual task 102 and a virtual task 104. The individual task 102 may, in turn, comprise or be associated with subtasks 106 and 108. Thus, as shown in FIG. 4, various tasks may be organized or arranged in several subtasks. Each subtask may, for example, provide more detailed information on an individual task and an operation performed on an individual task (or a virtual task including the individual task) may also be performed on a subtask in an automated fashion without further human interaction.

It will be appreciated that any number of individual tasks may be associated or grouped into a virtual task and that any combination of individual tasks and virtual tasks may be provided and grouped. Further, tasks may be arranged into different contexts which may then be interrelated.

Figure 5:
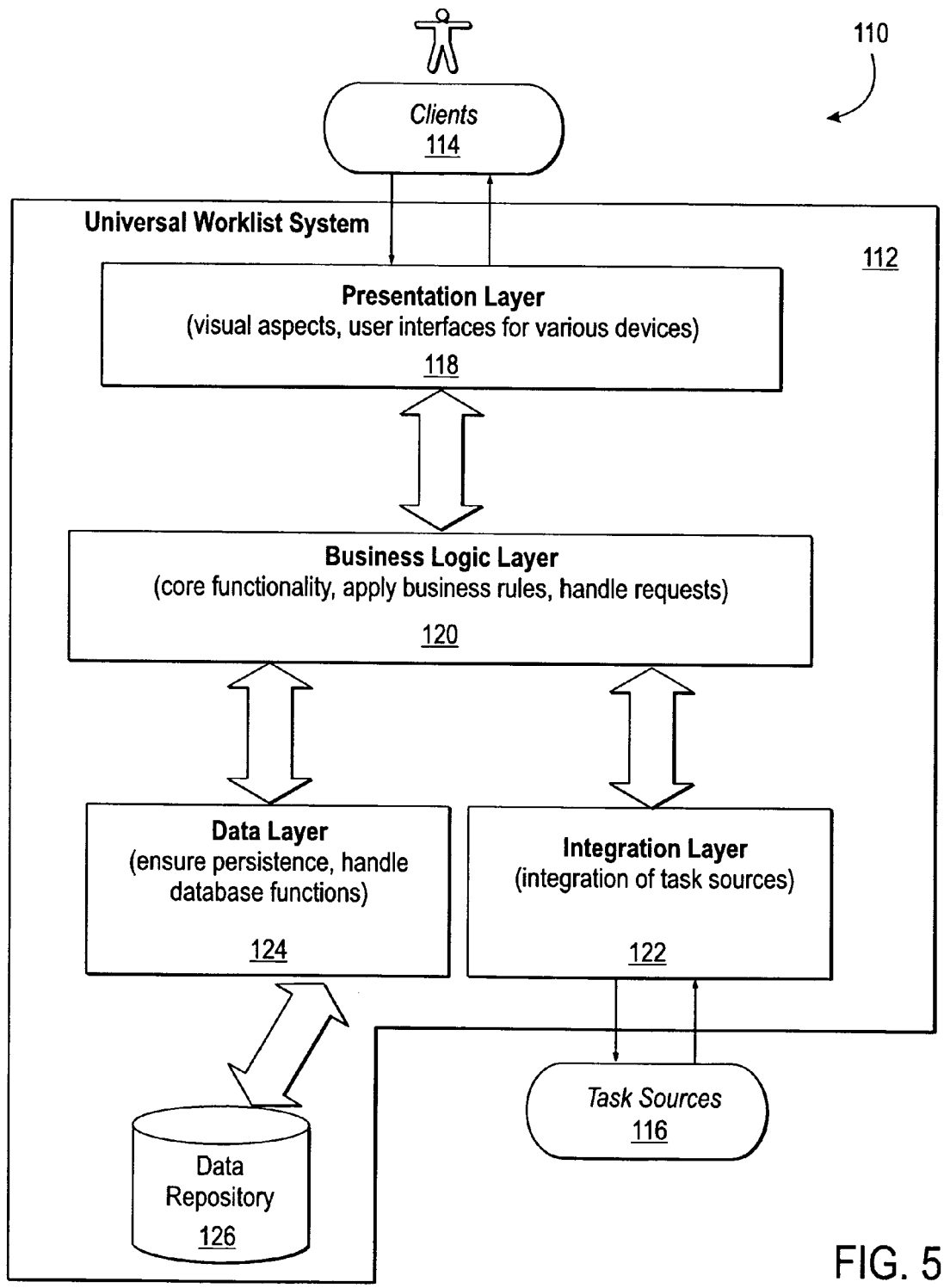
FIG. 5 shows exemplary system architecture wherein the task management systems of FIGS. 2 and 3 may be deployed.

In one exemplary embodiment, the systems 50 and 60 may be included in exemplary worklist system architecture 110 (see FIG. 5). The exemplary architecture 110 is shown to include a universal worklist system 112 which communicates via network(s) or communication channel(s) to a plurality of clients 114 and to a plurality of task sources 116. The communication link between the system 112 and the clients 114 may comprise any communication channel such as a computer network including an intranet and/or extranet. Likewise, the communication link between the system 112 and the task sources 116 may be via any communication channel such as a computer network including an intranet and/or extranet. The system 112 is shown, by way of example, to include a presentation layer 118 that may define graphical user interfaces presented to users via the clients 114. In one exemplary embodiment, the presentation layer 118 may control all visual aspects of the universal worklist system 112 and may receive data from a business logic layer 120. The business logic layer 120 may include the systems 50 and 60 and provide core task management functionality, apply business rules, and handle various requests from both the task sources 116 via an integration layer 122 or requests from the clients 114 via the presentation layer 118. The business logic layer 120 is also shown to interface with a data layer 124, which as an associated data repository or database 126. The data layer 124 may ensure persistence and handle database functions. The database 126 may, for example, be a relational database and include tables or the like to define the relationships or associations between tasks in various contexts (see module 76 in FIG. 3).

As mentioned above, the presentation layer 118 may provide one or more graphical user interfaces to an end user to display information on individual tasks and composite tasks. It will be appreciated that the systems 50, 60 may be a centralized systems where users are located within a single facility or may be distributed systems where users may be remotely located. Accordingly, a remote or local user may create and manipulate tasks stored in the database 126 wherein such manipulations and creations are processed using the business logic layer 120. In one exemplary embodiment, the business logic layer 120 represents the core functionality of the task management system. The business logic layer 120 may be responsible for all transformation of data received from the data layer 124 and the integration layer 122 and also provide an application program interface (API) to client applications located at the clients 114. Although a single instance of the business logic layer 120 is shown in FIG. 5, it will be appreciated that, in other embodiments, multiple instances of the business logic layer 120 may be located at various locations and on various different computer systems connected via any one or more networks. In one exemplary embodiment, the business logic layer 120 determines what data is to be stored and retrieved from the database 126 via the data layer 124. When a user creates, manipulates or deletes a task (composite task, cross-related task, individual task, or any other task), the business logic layer 120 may validate such operations or functionality against rules stored in the database 126. For example, when an end user changes the status of any one or more tasks (e.g., individual task, subtask, composite or virtual tasks, or the like) the business logic layer 122 may determine whether or not a user is allowed to make these changes and thus determine if the status change is valid. Likewise, when a user performs a particular operation on a selected composite task, the business logic layer 120 may then, in an automated fashion, perform the particular operation on all individual tasks or virtual tasks associated with the selected virtual task. Thus, in one exemplary embodiment, the business logic layer 120 may define core functionality, business rules, or the like which all composite tasks and individual tasks are subject to. The business logic layer 120 may communicate such changes or operations to the task sources 116 via the integration layer 122. The task sources 116 may be from any propriety task management system, for example, mySAP ERP, Microsoft Outlook, or the like. The integration layer 122 may thus comprise several connectors each enabling communication with a specific task source and establish a one-way or two-way connection to a task source. A one-way connection may simply validate and integrate incoming tasks whereas a two-way connection may additionally transmit data to the original task source.

Figure 6:
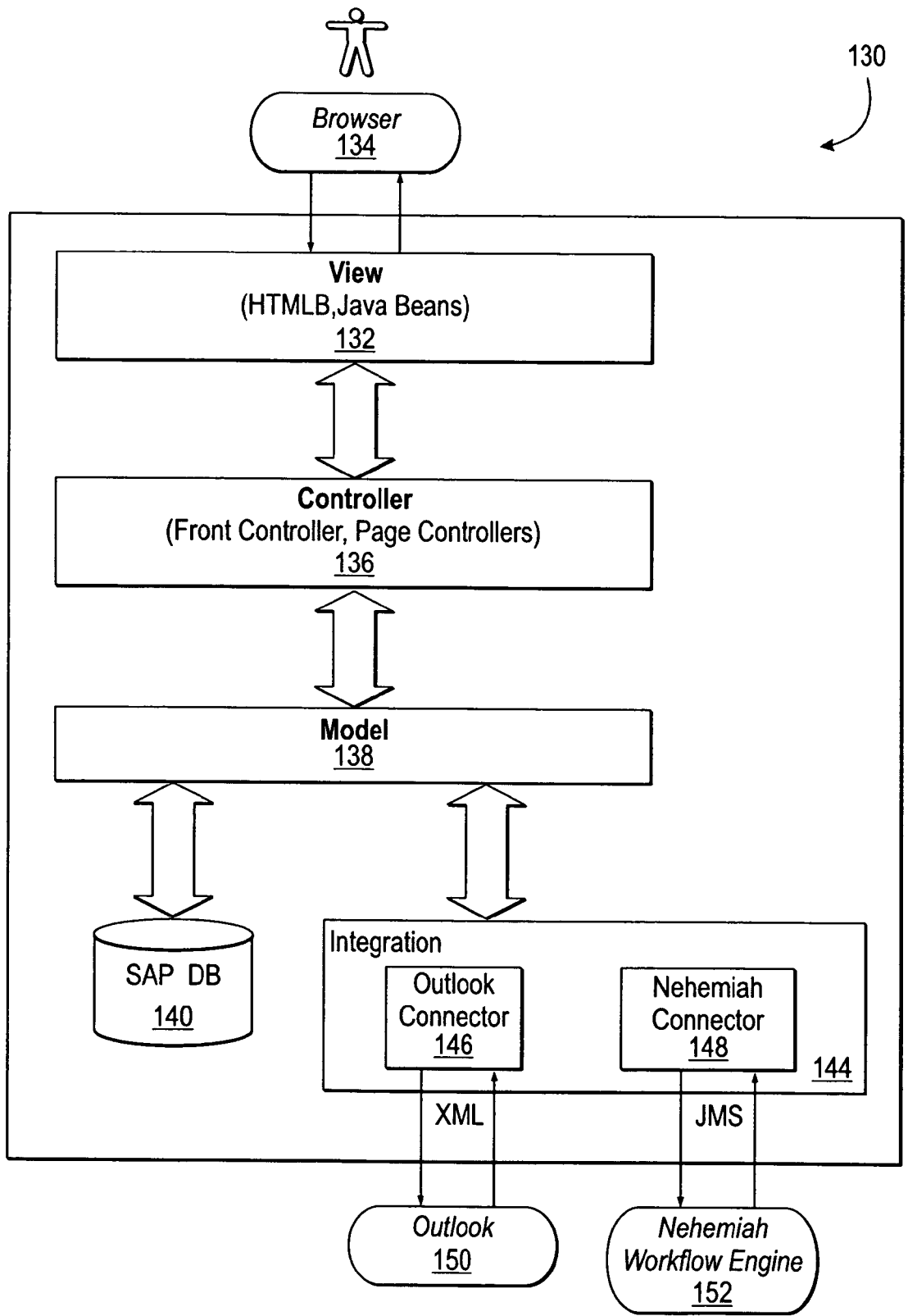
FIG. 6 shows further exemplary architecture wherein the task management systems of FIGS. 2 and 3 may be deployed.

Further exemplary architecture in which to deploy the systems 50 and 60 is shown in FIG. 6. In particular, reference 130 shows exemplary architecture for implementing a method and a system to manage a plurality of tasks in a browser-based computer environment. The architecture 130 includes a view layer 132 (including for example HTMLB code and Java Beans) to generate a graphical user interface viewable on a browser 134 of a client computer. The view layer 132 communicates with a controller layer 136 including a font controller, a page controller, and the like. The controller layer 136 communicates with a model layer 138. The model layer 138 may represent virtual or composite task data, individual task data, and business logic that may manage and govern the creation, modification, deletion or any other manipulation of tasks. In one exemplary embodiment, the model layer 138 provides an interface for client applications to access and use a universal worklist or task management system. The model layer 138 may communicate with a database 140 (e.g., a SAP database) via an optional hibernate framework 142. Further, the model layer 138 may communicate with an integration layer 144 which, for example, may include an Microsoft Outlook connector 146, a Nehemiah connector 148, or any other appropriate connector to integrate a further task management system. The Microsoft Outlook connector 146 may communicate with an Outlook application 150 using XML, and the Nehemiah connector 148 may communicate with a Nehemiah workflow engine 152 using JMS.

In one exemplary embodiment, the view layer 132 provides graphical user interfaces and is responsible for presentation of data to a user via the browser 134 and for receiving user input (e.g. creation or manipulation of tasks) from the browser 134. In one exemplary embodiment, the user interface is an HTMLB interface which is a JSP tag library built from the SAP Enterprise Portal. Java Beans may be used to display components (e.g., tables and hierarchical trees) and information via the browser 134.

The database 140 may be a relational SQL database. The hibernate module 142 may provide persistent service that allows storage of Java objects in the relational SQL database. The integration layer 144 may be responsible for the integration of diverse task sources. Accordingly, as described above, the integration layer 144 may include a plurality of connectors to different tasks sources wherein each connector establishes and manages communication between a task source and the system 130.

Figure 7:
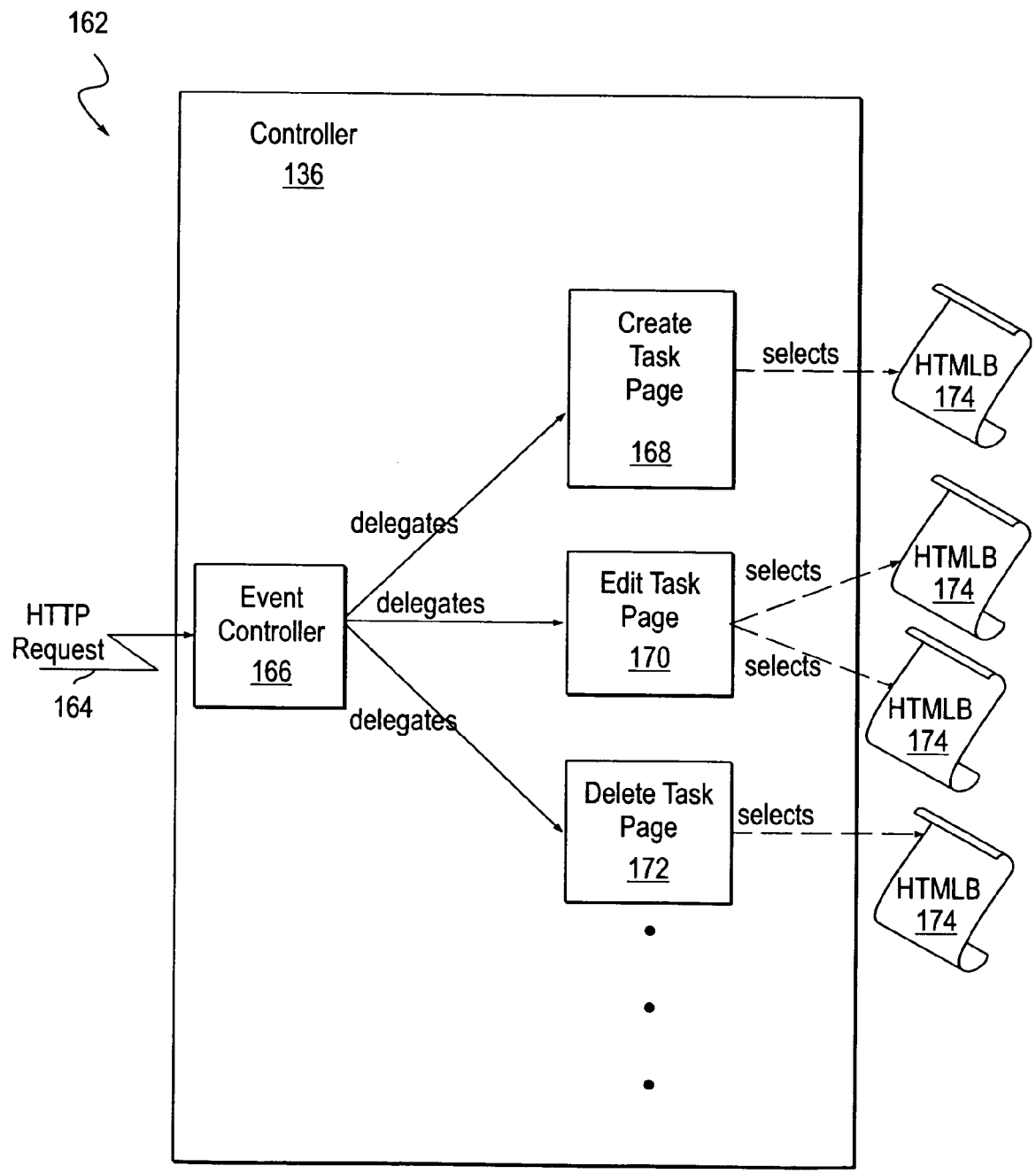
FIG. 7 shows exemplary architecture of a controller of the architecture of FIG. 6.

The controller layer 136 may translate task management user interactions into actions to be performed by the model layer 138. For example, if a user performs an operation on a virtual or composite task, the controller layer 136 may translate the operation into an action that is performed on each individual task associated with the composite task. The controller layer 136 may also select an appropriate view or graphical user interface related to the virtual task for presentation to the user. In one exemplary embodiment, the controller layer 136 is realized as a two-layered and distributed controller component 162 (see FIG. 7). The controller layer 136 may receive HTTP requests as shown by arrow 164 which are fed into an event controller 166 which, in turn, delegates the request to at least one of a create task page module 168, and edit task page module 170, a delete task page 172, and so on. In response to the aforementioned, one or more pages 174 (e.g., HTML pages) may be generated for display by the browser 134.

In one exemplary embodiment, the systems 50 and 60 generate web-based graphical user interfaces that allow a user to manipulate tasks, display tasks in different views and, in certain embodiments, customize the user interface. Reference numeral 180 (see FIG. 8) shows an exemplary graphical user interface (GUI) generated by the systems 50 and 60. The GUI 180 has a task browser display area 182 where tasks may be shown in a tree or hierarchical view. In the GUI 180, seven exemplary composite tasks are shown each of which groups a plurality of individual tasks. In the exemplary GUI 180, the composite tasks are shown to be Completed Tasks, Financials, Leave Requests, Nehemiah tasks, Organize CR meeting, Unsorted tasks, and UWL project. As mentioned above, each virtual or composite task may include a plurality of individual tasks. For example, the Financials composite task 184 is shown to include the following exemplary subtasks: Order new server, Pay new laptop and Pay phone bill. Likewise, the Organize CR meeting composite task 186 is shown to include the following individual tasks: Organize the required equipment, Reserve meeting room and Send out invitations. However, it will be appreciated that the composite task may relate to any activities or projects or processes that include a plurality of individual tasks (each of which may include a plurality of subtasks). Further, the individual tasks and the composite or virtual tasks may be grouped in to different contexts.

Details of any individual task may be shown in a details display area 188 and, as shown by arrow 190, a Related Tasks form is shown to include a data entry field 192 to define a parent task or composite task associated with the individual task, a drag and drop box 194 to allow a user to drag and drop an individual task into the parent task thereby associating the task with both the current individual task as well as the composite task, a virtual check box 196 that allows a user to define the task as a virtual task or composite task comprising a plurality of individual tasks, and a child task drag and drop box 198 to associate a particular individual task with a subtask.

The GUI 180 also includes a task information area 200 which provides a name of the task, a user associated with the task, an owner of the task, a priority of the task, a status of the task, scheduling information, and so on. In one exemplary embodiment, the GUI 180 may include a plurality of tabs thereby to allow a user to tab through various tasks and see details related thereto.

Figure 8:
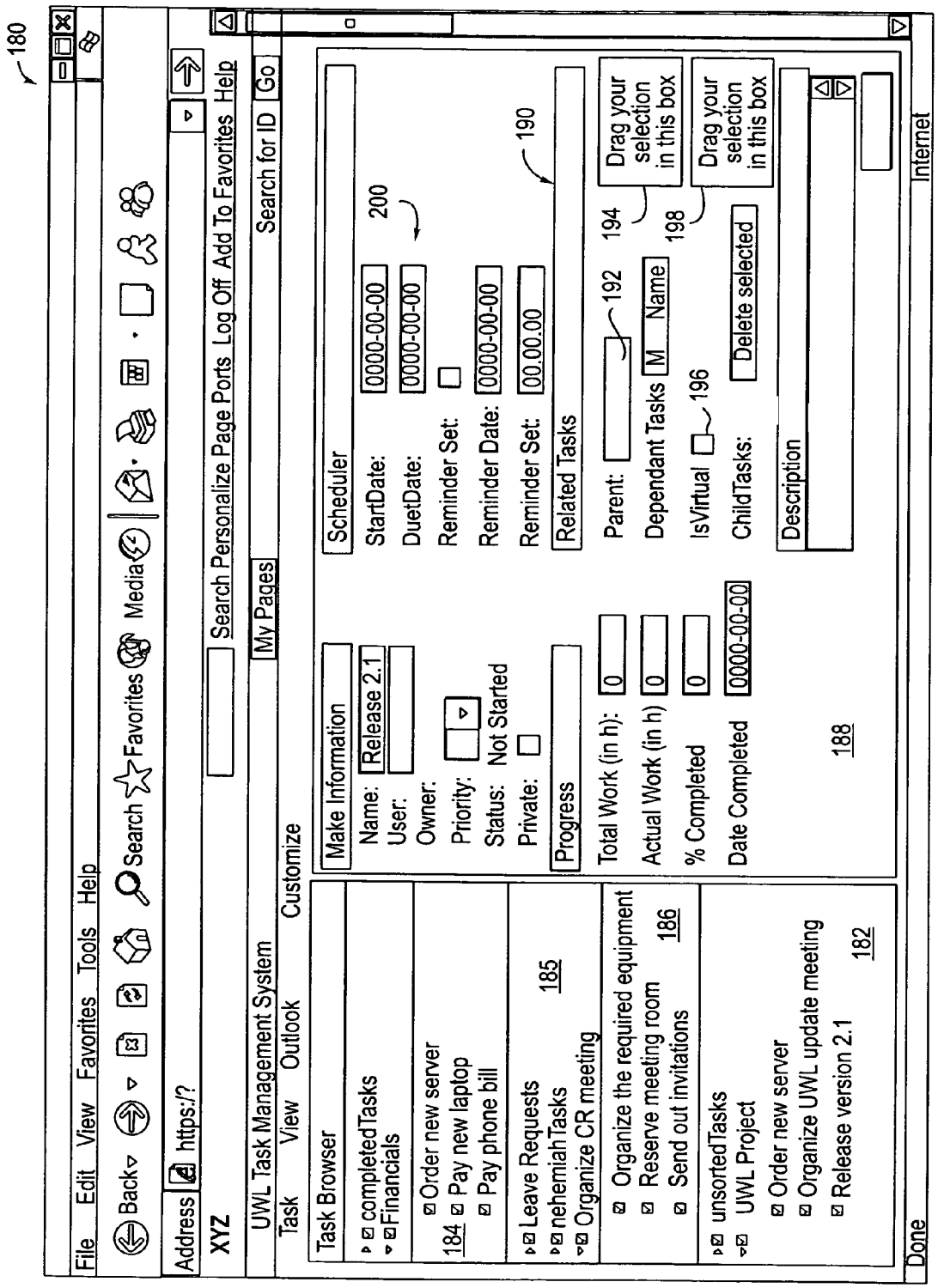
FIG. 8 shows an exemplary graphical user interface to manage and process composite or virtual tasks in the systems of FIGS. 2 and 3.

The GUI 180 in its task browser display area 182 displays various composite tasks and individual tasks in a tree or hierarchical view. Thus, hierarchical relationships between individual tasks and composite tasks may be readily seen. Itemized composite tasks and individual tasks are provided in the form of links so that a user may click on any one of these links to display more comprehensive detail on the task in the details display area 188. Thus, the details display area 188 may provide more detail on an individual task or display information on one or more individual tasks associated with a composite or virtual task. In order to control the amount of information and tasks displayed by the GUI 180, a user may expand and contract information displayed with respect to a composite task. For example, the Financials composite task 184 may be expanded, as shown in FIG. 8, to show all of the individual tasks associated with it. However, a user may also contract the list so that only the Financials composite task is shown. An example of such a contraction is shown by the Leave Requests composite task 185. It will be appreciated that the Financials composite task may form part of a first task context and the Leave Requests may form part of a second task context.

Figure 9:
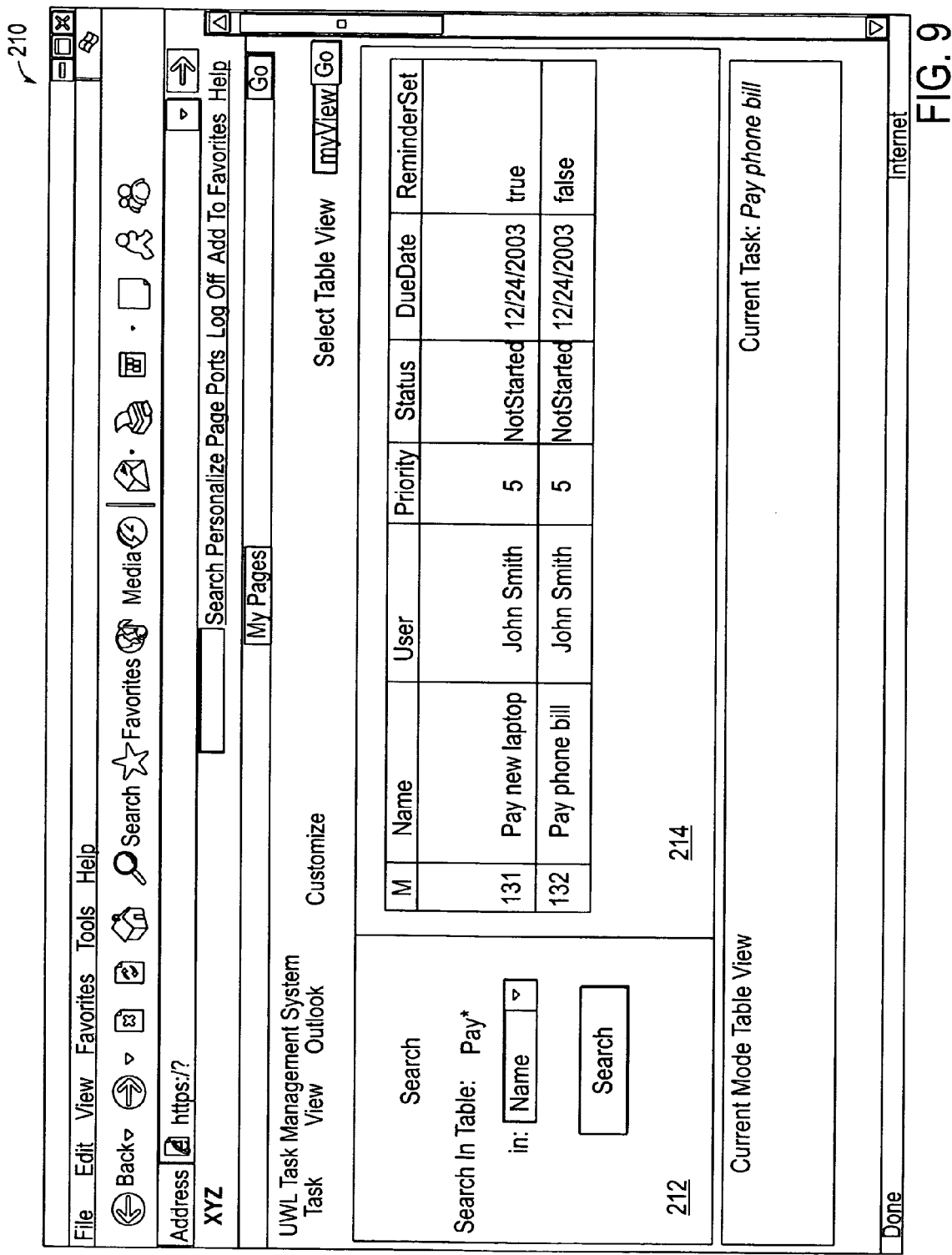
FIG. 9 shows a further exemplary interface of the systems of FIGS. 2 and 3.

Referring in particular to FIG. 9, reference numeral 210 shows an exemplary GUI wherein task data is displayed in a table view by the systems 50 and 60. A search facility is provided in display area 212 and a detail display area 214 is provided that displays individual tasks associated with a selected composite task in a tabular fashion.

Figure 10:
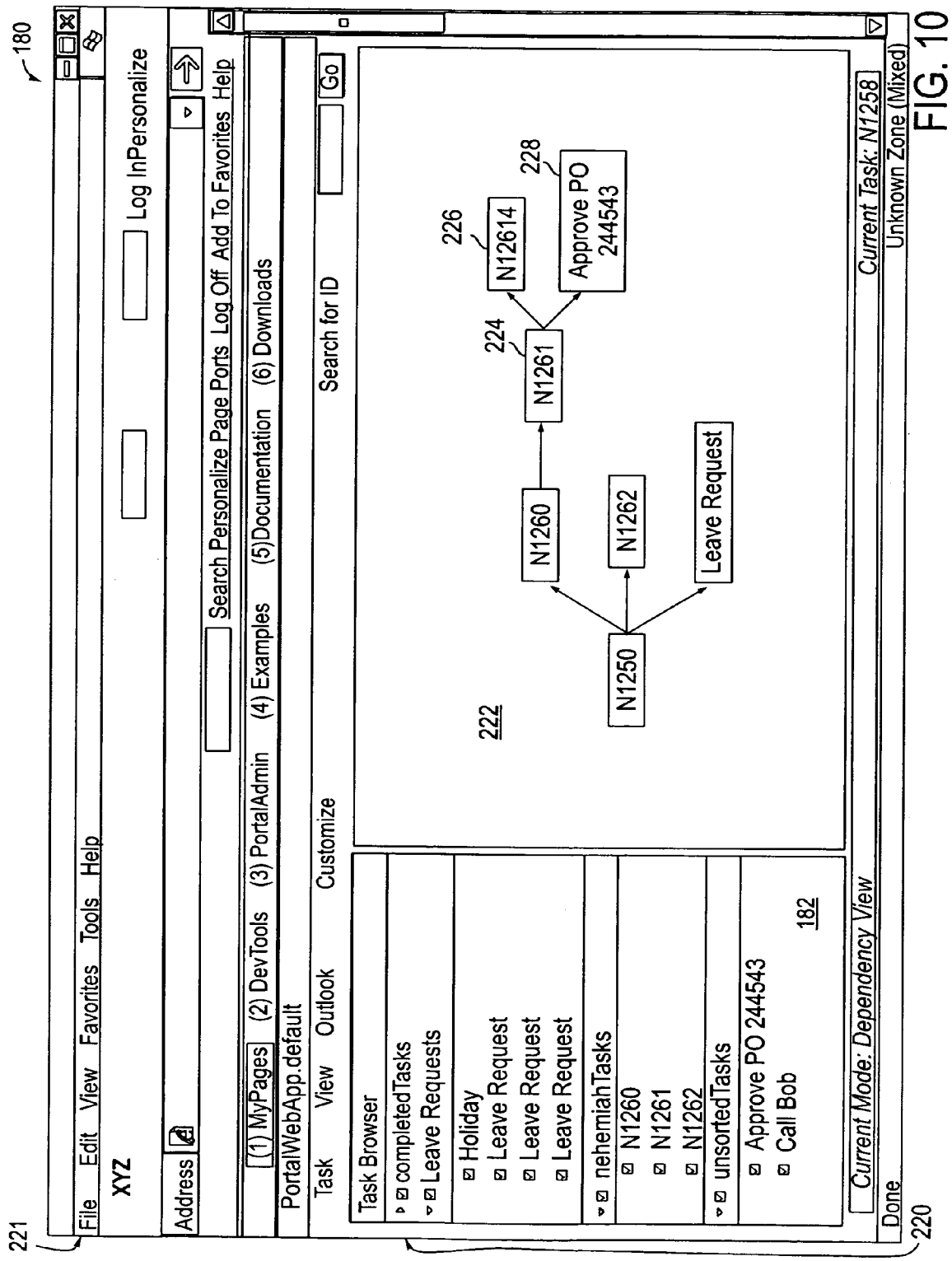
FIG. 10 shows a further exemplary graphical user interface of the systems of FIGS. 2 and 3 showing in particular a workflow representation associated with various individual tasks and composite tasks.

Referring in particular to FIG. 10, reference numeral 220 generally indicates a further GUI generated and presented to a user by the systems 50 and 60. The GUI 220 includes a Task Browser area 182 and a workflow representation is displayed in a workflow display area 222. The workflow representation may display both composite and individual tasks. Further, the status of a tasks may be color coded. For example, completed tasks may be shown in one color whereas pending tasks may be shown in another color. In one exemplary embodiment, the workflow display area 222 depicts the dependencies between tasks and not necessarily a composite relationship. Using an input device such as a keyboard or mouse, a user can relate tasks that are unrelated (cross-context tasks) in a sense that they stem from different task sources. The exemplary workflow display area 222 depicts that the user choose to first process task 1250, and then tasks 1260, 1262, and "Leave Request" in parallel.

In certain circumstances, the distribution of work and the particular selection of technologies may often only be achieved when a particular contractor has been selected, and a contractual agreement about intellectual property has been signed. The dependency between the contexts may not be trivial and can currently only insufficiently be predicted, particularly in projects that do not justify the expenses of substantial pre-analyses. However, human experts that are closely affiliated to a given set of contexts are able to interrelate tasks from different contexts at runtime, this is one of the reasons they are called specialists. The cross-context functionality of the systems 50, 60 may, in one exemplary embodiment, provide users with a methodology and a tool by which they can express the dependencies of tasks stemming from the same or from different contexts. In one embodiment, the GUI 220 allows a user to associate or link tasks in different contexts (see also FIG. 3). The task browser area 182 is shown to include four exemplary tasks, namely, Completed Tasks, Leave Requests, Nehemiah Tasks, and Unsorted Task that can be related in the workflow display area 222. Although these tasks in the given example may be from unrelated sources, representing these tasks in the workflow display area 222 allows a user to relate seemingly unrelated tasks.

Thus, in one exemplary embodiment, the GUI 220 allows a user in a single interface to define a list of tasks, cross-relate the tasks, and an order in which the tasks should be performed. The cross-context functionality allows tasks to be sourced from a plurality of different sources. It will be appreciated that the cross-context functionality may be extended to emails. For example, a user may have numerous emails wherein some of those emails may actually be requests for the user to do something; many of the emails may however just be informative (e.g., status of projects, attendance of meetings, and so on). The user may filter out those emails and drag relevant emails into tasks. Thus the GUI 220 may provide cross-context task management functionality allowing users to relate tasks from the same system or from different systems, structure work, and show user defined dependencies between the tasks. For example, in a project management environment, where many people are involved, a project manager may define a list of activities that need to be done on the project and graph them using the GUI 220. Tasks or activities from many different sources may be pushed to the project manager or to any participants in the project from many different sources with different priorities. The project manager or any participant in the project can define their own personal workflow. For example, the user may define a workflow for all tasks pushed to the user for completion during a given period of time (e.g., the next three weeks or four weeks). Accordingly, if a user receives tasks from multiple sources (e.g., in different contexts), the user can prioritize these tasks and arrange them in the workflow display area 222 to show how the user would like to work on those tasks in the given period.

An example of relating tasks across different contexts could be a user receiving an email requesting the user not to approve a payment until the user gets an acknowledgement from the sender. However, a payment approval request may come in from work flow engine some time later and the email requesting non-payment may be forgotten. However, the systems 50, 60 allow the user to relate the email requesting non-payment to a task thus minimizing the likelihood of the request for non-payment being forgotten when the subsequent request for payment is received (which can also be related to the task).

In another exemplary embodiment, all individual tasks may be associated or related to a particular virtual or composite task may be shown in the workflow representation. For example, composite task 224 may comprise an individual task 226 (N1264) as well as a further task 228 (Approve PO 244543). A user selecting or clicking on the individual task 226 may then be taken to a display screen which shows details of the particular task. Likewise, a user clicking on the task 228 may then be provided with a further workflow diagram showing all tasks associated with the task 228 in the task source, e.g. in the backend system's business process.

In one exemplary embodiment, the workflow representation is arranged in such a fashion so that composite tasks and individual tasks are arranged according to their relative priority. For example, tasks with a higher priority may be provided on a left hand side of the workflow representation with tasks of decreasing priority positioned towards a right hand side of the workflow representation. In one exemplary embodiment, the GUI 220 is realized with the aid of VGJ (Visualizing Graphs with Java) library and is displayed using VML (Vector Markup Language). A user may change the priority of any tasks by dragging the task to a different position in the workflow representation.

Tasks may be represented as colored boxes whereas the dependencies of the tasks may be shown as connecting arrows that connect the boxes. Each box may be labeled with the name of a corresponding task and, as mentioned above, may be colored to represent the task's status. In one exemplary embodiment, a user may use a pointing device to relocate (e.g. drag) tasks displayed in the workflow representation thereby to change their relative priority. The graphical user interface 20 includes a toolbar 22 with a plurality of dropdown menus to allow a user to manage tasks entered into the prior art task management system. The GUI 220 is also shown to include toolbar 221 providing a FILE dropdown menu, an EDIT dropdown menu, a VIEW dropdown menu, a FAVORITES dropdown menu, a TOOLS dropdown menu, an ACTIONS dropdown menu, and a HELP dropdown menu.

Figure 11:
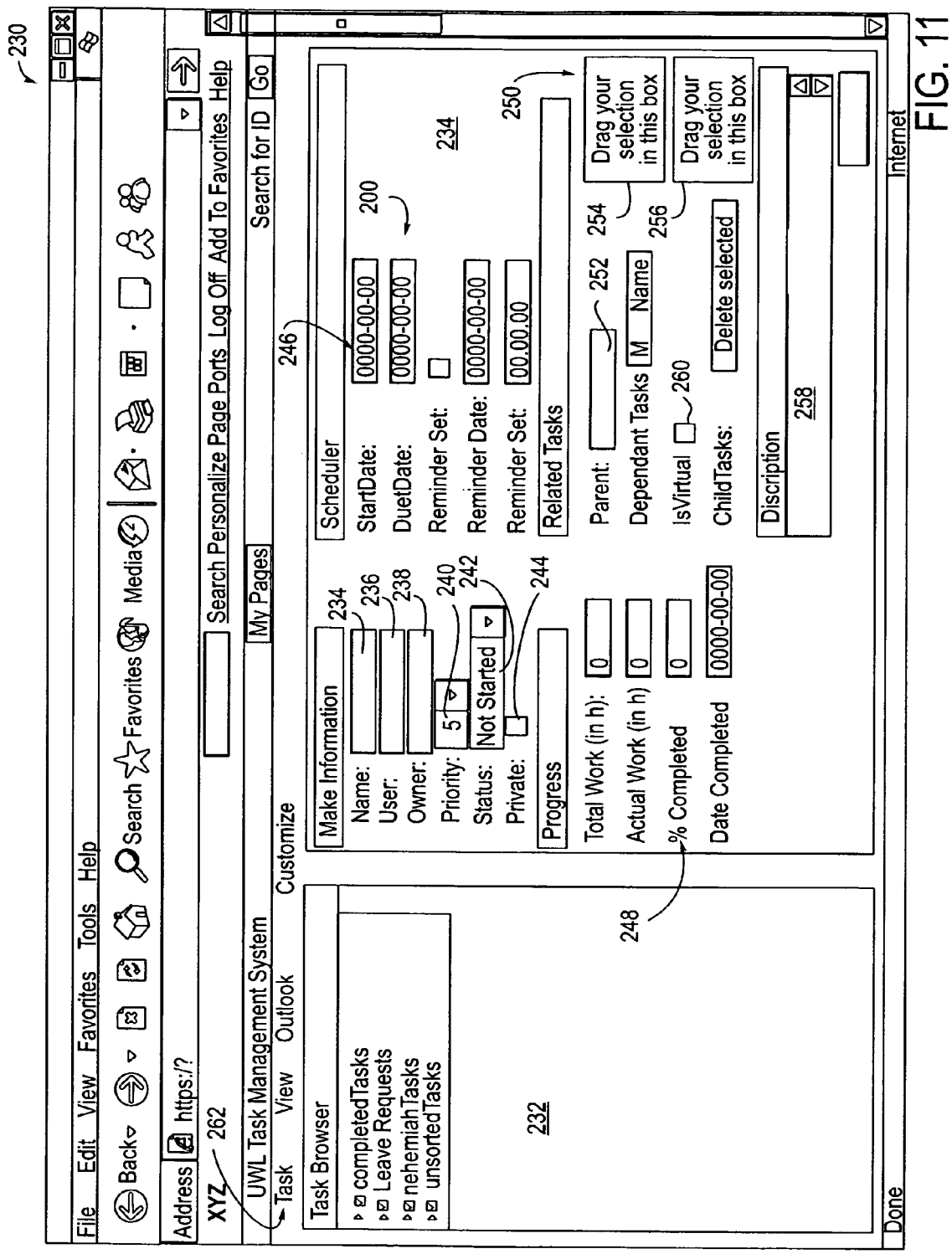
FIG. 11 shows an exemplary graphical user interface to create a new task.

Referring in particular to FIG. 11, reference numeral 230 generally indicates an exemplary GUI defining an input mask to create a new task. The GUI 230 includes a task browser area 232 and a task details area 234. In the exemplary embodiment shown in FIG. 11, data entry fields as well as dropdown menus are provided to create and define a new task. The GUI 230 includes a plurality of data entry fields including a Name field 234, a User field 236, an Owner field 238, a Priority dropdown menu 240, a Status dropdown menu 242, and a Private check box 244. The aforementioned information may define main information and, associated with the main information, may be Schedule information as shown at 246 and Progress information as shown at 248. However, in addition to the aforementioned, a Related Tasks information area 250 allows a user to define a Parent task e.g. a composite task using a dropdown menu 252, add dependent tasks to a task (e.g., add an individual task to a composite task) using a drag and drop box 254, and add child tasks (e.g., a subtask to an individual tasks) using a drag and drop box 256. A description field 258 is provided to allow a user to add a description to the particular task. If the task is a composite task comprising a plurality of individual tasks or one or more other composite or virtual tasks, a virtual check box 260 may be checked. Using the GUI 230, a user may thus define individual tasks, subtasks associated with individual task, and virtual or composite tasks comprising a plurality of individual tasks, composite tasks, and/or subtasks. Using operations provided in a toolbar 262, a user may modify existing tasks, delete existing tasks, mark existing tasks as completed, change due dates and start dates, or any other manipulation of any individual task or composite task. In one exemplary embodiment, the Related Tasks information area 250 allows a user to select a parent task from a dropdown list, which may then contain a new task as a child task. In order to add a child task or dependent task to a new task, the user can drag and drop the task items from the hierarchical tree to the target field provided by the drag and drop boxes 254, 256. In a similar way, various other graphical user interfaces may be provided to allow a user to manipulate composite tasks, individual task, and subtasks.

Figure 12:
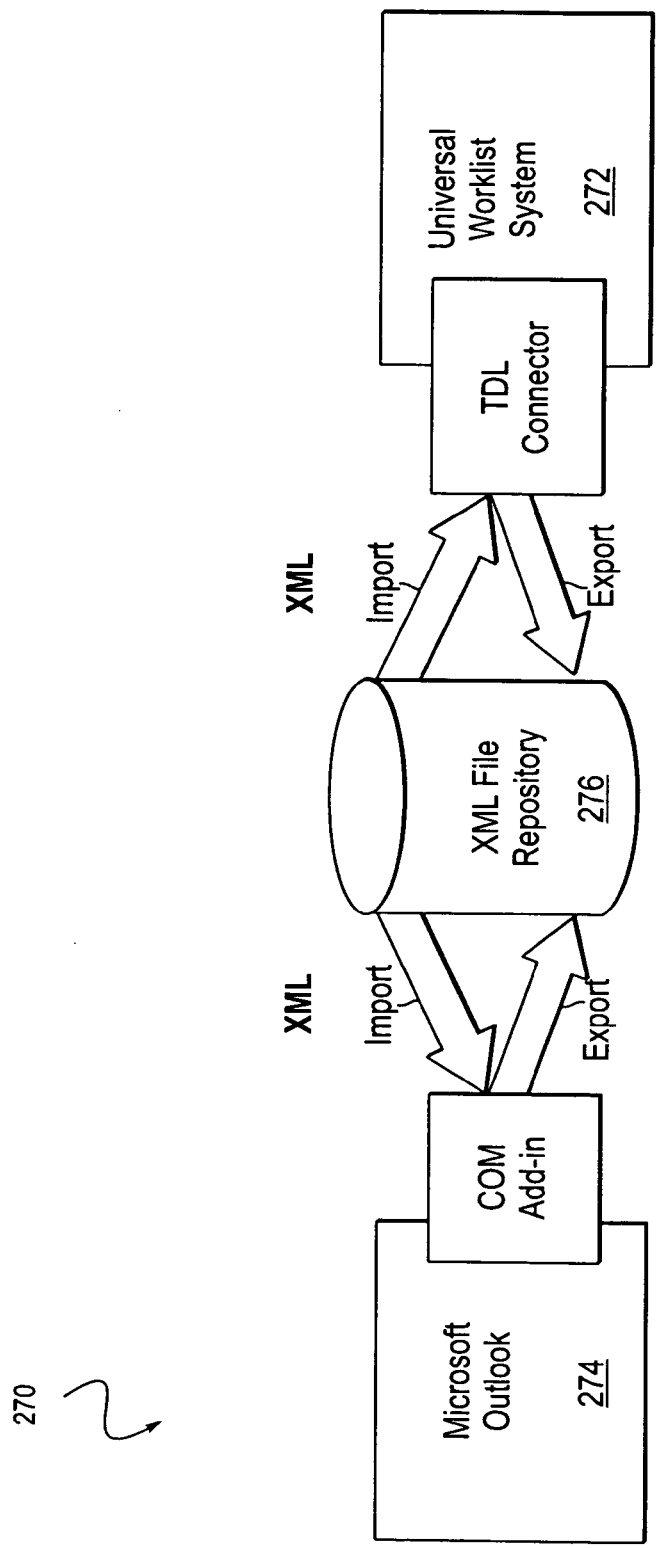
FIG. 12 shows an exemplary integration diagram to interface the systems of FIGS. 2 and 3 to legacy task management systems.
Figure 13:
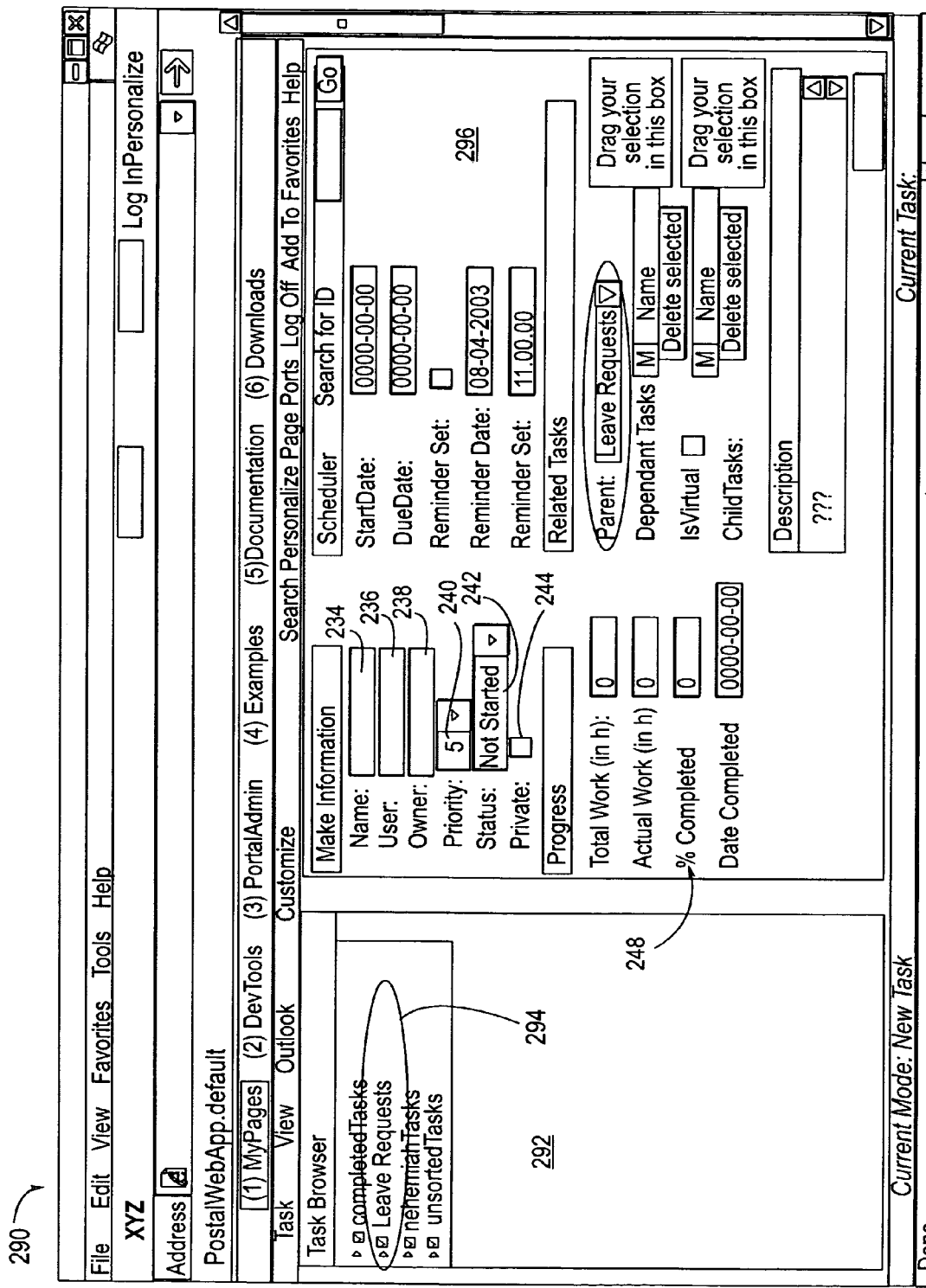
FIG. 13 shows an exemplary graphical user interface to create a virtual or composite task.
Figure 14:
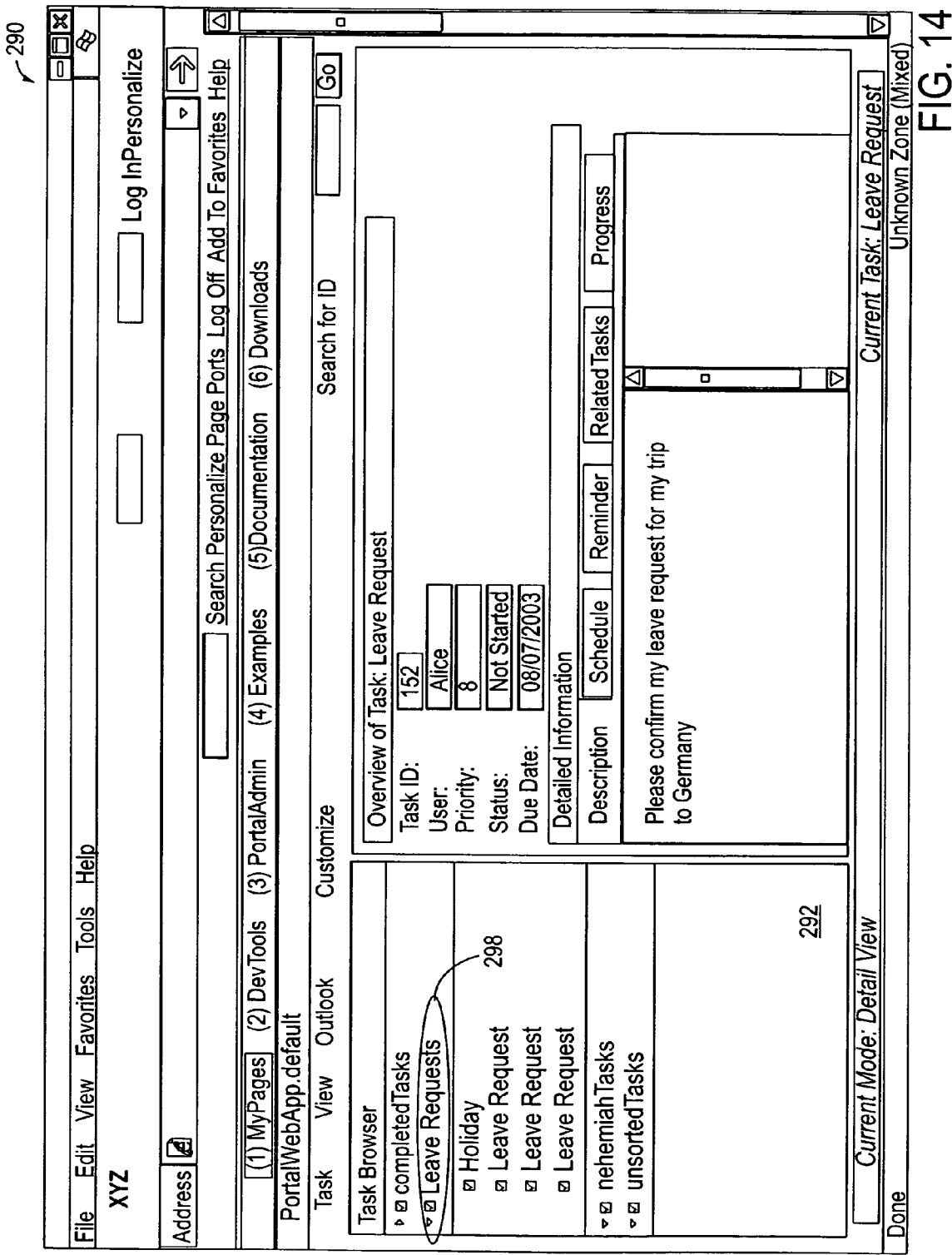
FIG. 14 shows an exemplary graphical user interface of details of an individual task forming part of a composite task.
Figure 15:
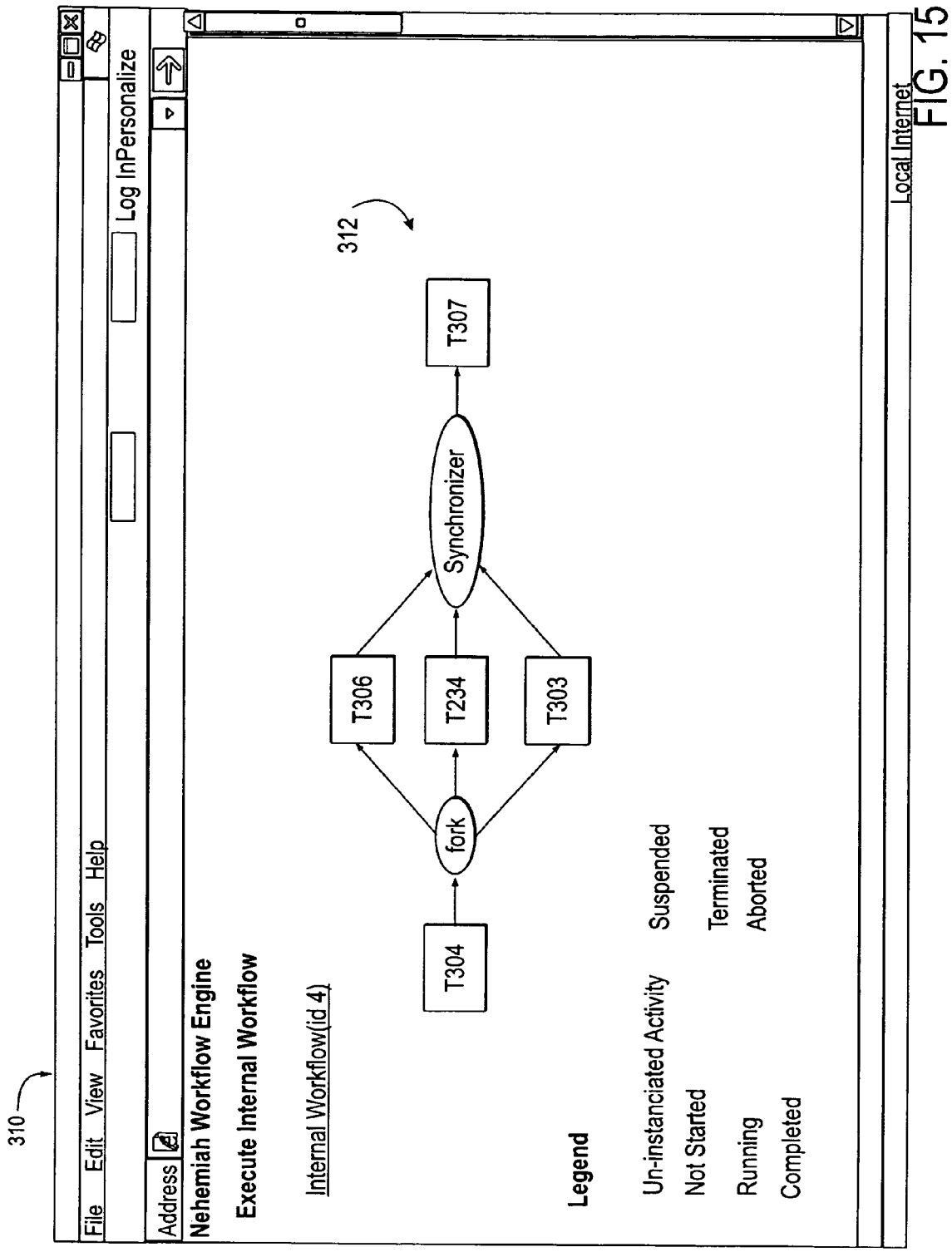
FIG. 15 shows an exemplary graphical user interface of a task browser including a plurality of composite tasks and a workflow representation associated with the tasks.

As shown in FIG. 12, the task management system and method described herein may be interfaced with other task management systems. For example, reference numeral 270 shows an exemplary integration diagram of the systems 50 and 60 with a Universal Worklist system 272 (e.g. as available from SAP) and a Microsoft Outlook application 274 (as available from Microsoft Corporation). In one exemplary embodiment, an XML file repository 276 is provided and XML data is imported and exported between the XML file repository 276 and the Microsoft Outlook application 274, and between the XML file repository 276 Universal Worklist System 272.

Referring to FIGS. 13 to 16 of the drawings, further exemplary graphical user interfaces are shown to allow a user to manipulate various composite tasks, individual tasks and subtasks. In particular, reference numeral 290 generally indicates a GUI that allows a new task to be inserted or created in a hierarchy of tasks provided in a task display area 292. For example, a Leave Requests composite task 294 may be selected by a user whereupon a new task form 296 is provided to allow the user to enter data and define a new task. Once the new task (in exemplary form of a leave request) has been created, a further individual task 298 is added to the hierarchy of tasks displayed in the task display area 292 (see FIG. 14).

GUI 300 (see FIG. 15) shows a how a task from the worklist may refer to a business process in the Nehemiah workflow engine available from SAP Research. The rationale is that a single task in the worklist is often part of a bigger context in the backend system. Reference numeral 312 shows a corresponding workflow representation using a color scheme to define a status of a task.

Figure 16:
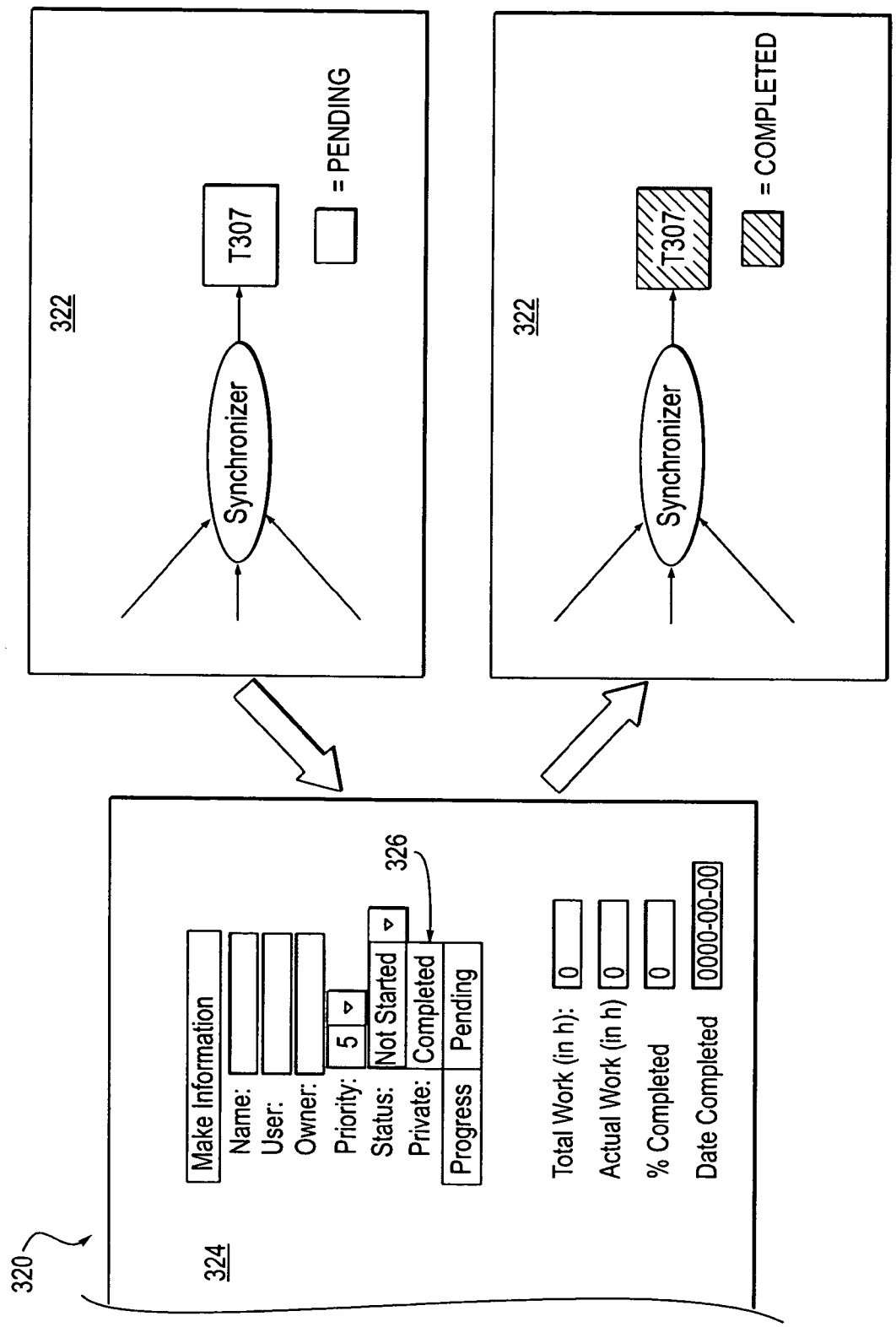
FIG. 16 shows an exemplary graphical user interface to process a composite task thereby to automatically process a plurality of individual tasks forming part of the composite task.

Referring in particular to FIG. 16, reference numeral 320 generally indicates a process flow to change a status of a Nehemiah task (e.g., backend business process). As shown in GUI 322 a workflow task may show a task as running or in progress and such a task may be selected by a user using a pointing device such as a mouse. Thereafter, a GUI 324 may be generated in response to the user selecting the running task and, using a dropdown menu 326, the status of the task may be changed to completed. Thereafter, the GUI 322 changes a color of the task block in the workflow representation to indicate that the task has been completed. If the status of a composite or virtual task is changed, then the status of all individual tasks associated with the composite or virtual task is also changed.

Figure 17A:
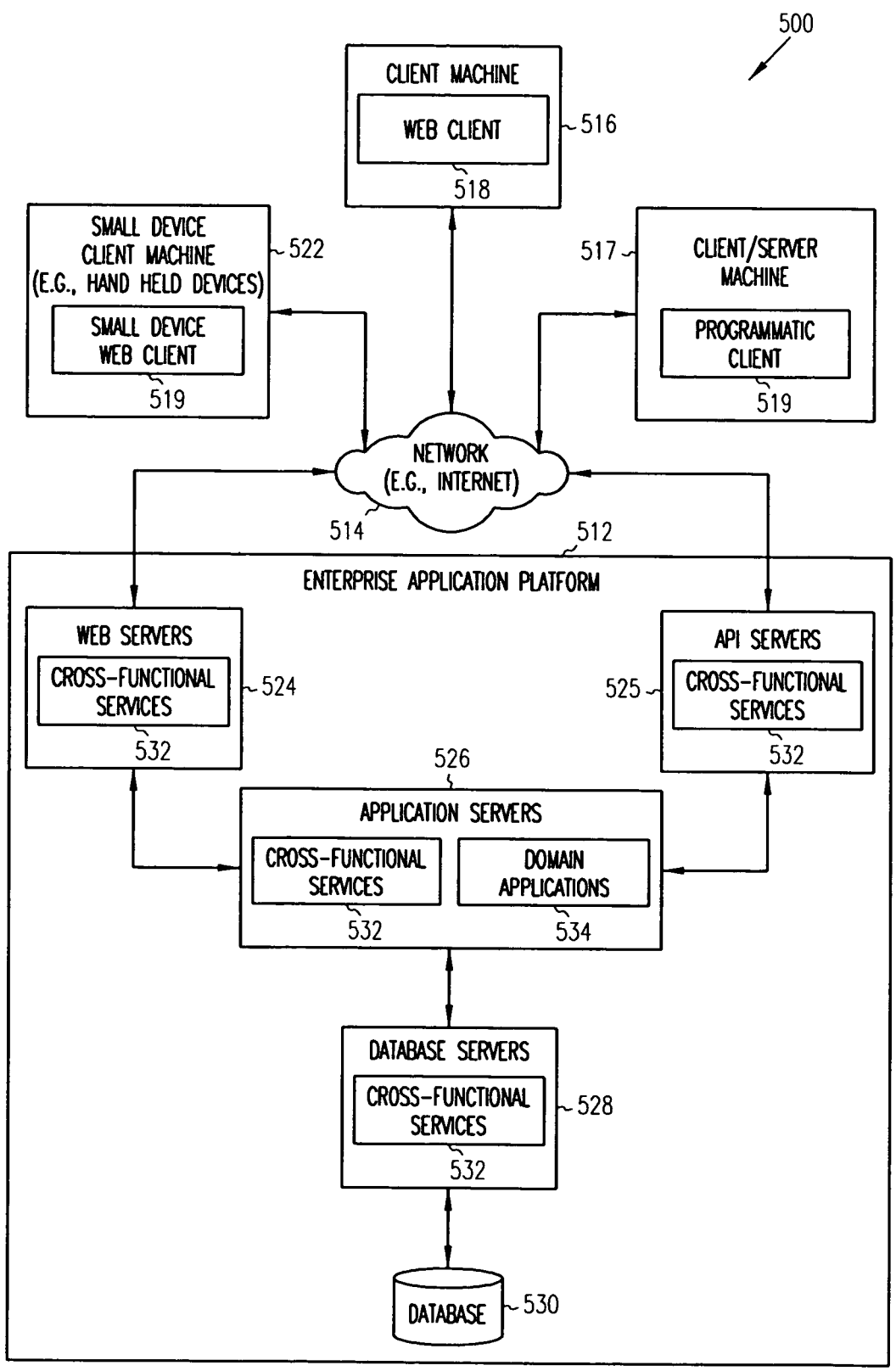
FIG. 17A is a network diagram depicting a system, according to one exemplary embodiment, having a client-server architecture.

A further exemplary embodiment of invention is shown in FIGS. 17A and B. FIG. 17A is a network diagram depicting a system 500, according to one exemplary embodiment, having a client-server architecture. A platform (e.g., machines and software), in the exemplary form of an enterprise application platform 512, provides server-side functionality, via a network 514 (e.g., the Internet) to one or more clients. FIG. 17A illustrates, for example, a client machine 516 with web client 518 (e.g., a browser, such as the INTERNET EXPLORER browser developed by Microsoft Corporation of Redmond, Wash. State), a small device client machine 522 with a small device web client 519 (e.g., a browser without a script engine) and a client/server machine 517 with a programmatic client 519.

Turning specifically to the enterprise application platform 512, web servers 524, and Application Program Interface (API) servers 525 are coupled to, and provide web and programmatic interfaces to, application servers 526. The application servers 526 are, in turn, shown to be coupled to one or more databases servers 528 that facilitate access to one or more databases 530. The web servers 524, Application Program Interface (API) servers 525, application servers 526, and database servers 528 host cross-functional services 532. The application servers 526 further host domain applications 534.

The cross-functional services 532 provide services to users and processes that utilize the information enterprise application platform 512. For instance the cross-functional services 532 provide portal services (e.g., web services), database services and connectivity to the domain applications 534 for users that operate the client machine 516, the client/server machine 517 and the small device client machine 522. In addition, the cross-functional services 532 provide an environment for delivering enhancements to existing applications and for integrating third party and legacy applications with existing cross-functional services 532 and domain applications 534. Further, while the system 500 shown in FIG. 17A employs a client-server architecture, the present invention is of course not limited to such an architecture, and could equally well find application in a distributed, or peer-to-peer, architecture system.

Figure 17B:
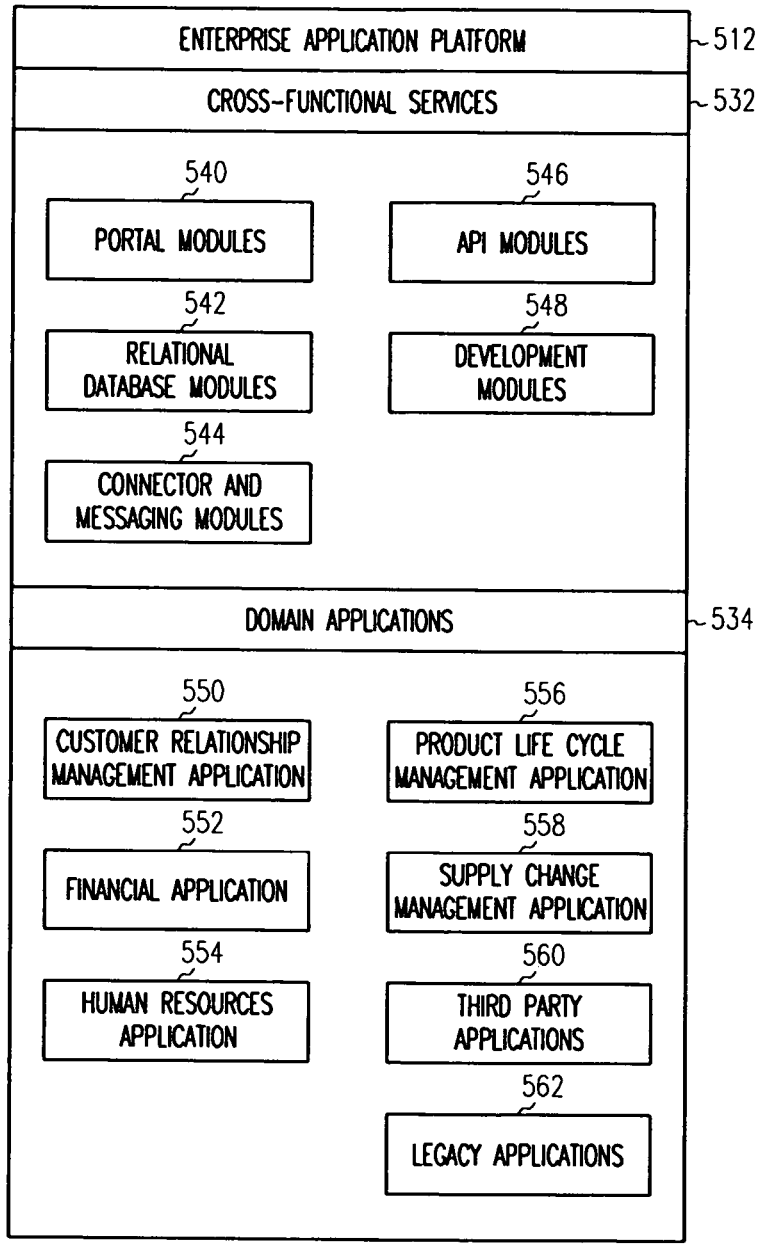
FIG. 17B is a block diagram illustrating enterprise applications and services as embodied in the enterprise application platform, according to an exemplary embodiment.

FIG. 17B is a block diagram illustrating enterprise applications and services as embodied in the enterprise application platform 512, according to an exemplary embodiment. The enterprise application platform 512 includes cross-functional services 532 and domain applications 534. The cross-functional services 532 include portal modules 540, relational database modules 542, connector and messaging modules 544, Application Program Interface (API) modules 546, and development modules 548.

The portal modules 540 enable a single point of access to other cross-functional services 532 and domain applications 534 for the client machine 516, the small device client machine 522 and the client/server machine 517. The portal modules 40 are utilized to process, author and maintain web pages that present content (e.g., user interface elements and navigational controls) to the user. In addition, the portal modules 540 enable user roles, a construct that associates a role with a specialized environment that is utilized by a user to execute tasks, utilize services and exchange information with other users and within a defined scope. For example, the role determines the content that is available to the user and the activities that the user may perform. The portal modules 540 include a generation module 564, a communication module 566, a receiving module 578 and a regenerating module 580 that are discussed further below. In addition the portal modules 540 comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 542 provide support services for access to the database 530 that includes a user interface library 536. The relational database modules 542 provide support for object relational mapping, database independence and distributed computing. The relational database modules 542 are utilized to add, delete, update and manage database elements. In addition the relational database modules 542 comply with database standards and/or utilize a variety of database technologies including SQL, SQLDBC, Oracle, MySQL, Unicode, JDBC The connector and messaging modules 544 enable communication across different types of messaging systems that are utilized by the cross-functional services 532 and the domain applications 534 by providing a common messaging application processing interface. The connector and messaging modules 544 enable asynchronous communication on the enterprise application platform 512.

The Application Program Interface (API) modules 546 enable the development of service-based applications by exposing an interface to existing and new applications as services. Repositories are included in the platform as a central place to find available services when building applications.

The development modules 548 provide a development environment for the addition, integration, updating and extension of software components on the enterprise application platform 512 without impacting existing cross-functional services 532 and domain applications 534.

Turning to the domain applications 534, the customer relationship management applications 550 enable access to and facilitates collecting and storing of relevant personalized information from multiple data sources and business processes. Enterprise personnel that are tasked with developing a buyer into a long-term customer may utilize the customer relationship management applications 550 to provide assistance to the buyer throughout a customer engagement cycle.

Enterprise personnel may utilize the financial applications 552 and business processes to track and control financial transactions within the enterprise application platform 512. The financial applications 552 facilitate the execution of operational, analytical and collaborative tasks that are associated with financial management. Specifically, the financial applications 552 enable the performance of tasks related to financial accountability, planning, forecasting, and managing the cost of finance.

The human resource applications 554 may be utilized by enterprise personal and business processes to manage, deploy, and track enterprise personnel. Specifically, the human resource applications 554 enable the analysis of human resource issues and facilitate human resource decisions based on real time information.

The product life cycle management applications 556 enable the management of a product throughout the life cycle of the product. For example, the product life cycle management applications 556 enable collaborative engineering, custom product development, project management, asset management and quality management among business partners.

The supply chain management applications 558 enable monitoring of performances that are observed in supply chains. The supply chain management applications 58 facilitate adherence to production plans and on-time delivery of products and services.

The third party applications 560, as well as legacy applications 562, may be integrated with domain applications 534 and utilize cross-functional services 532 on the enterprise application platform 512.

Figure 18:
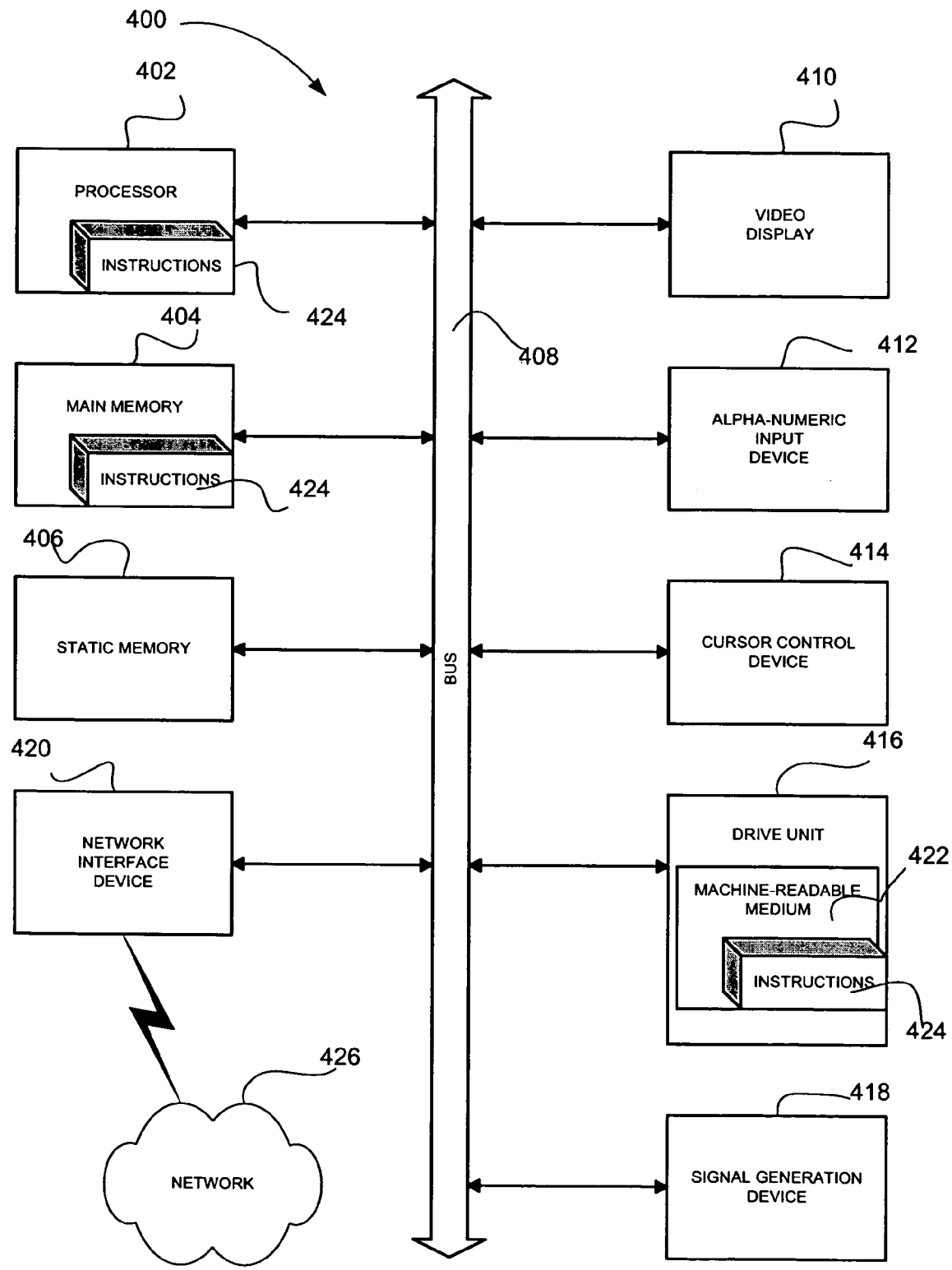
FIG. 18 shows an exemplary machine in the form of a computer system to implement any one or more of the methods and/or systems described herein.

FIG. 18 shows a diagrammatic representation of machine in the exemplary form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., HTTP).

While the machine-readable medium 422 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

What is claimed is:

1. A computer-implemented method of managing a plurality of tasks, the method comprising:
   providing a graphical user interface for a user to:
      identify a first task context and associate a plurality of first tasks with the first task context, and
      identify a second task context and associate a plurality of second tasks with the second task context;
   assigning attributes to the plurality of first tasks and the plurality of second tasks;
   specifying a relationship that associates at least one of the plurality of first tasks with at least one of the plurality of second tasks based on the attributes, the specified relationship identifying an operation that is associated with each of the at least one of the plurality of first tasks in the first task context and the at least one of the plurality of second tasks in the second task context;
   monitoring a user input to perform the operation on the at least one of the plurality of first tasks in the first task context; and
   in response to the user input, automatically identifying the at least one of the plurality of second tasks through the specified relationship and performing the operation on the at least one of the plurality of first tasks in the first task context and the at least one of the plurality of second tasks in the second task context.

2. The computer-implemented method of claim 1, further comprising associating at least one email with at least one of the plurality of first tasks and the plurality of second tasks.

3. The computer-implemented method of claim 1, further comprising receiving the plurality of first tasks and the plurality of second tasks from a plurality of task sources, the plurality of task sources including an email source and a task management system.

4. The computer-implemented method of claim 1, further comprising sharing the plurality of first tasks and the plurality of second tasks between different software applications.

5. The computer-implemented method of claim 1, wherein the specified relationship is based on identifying one or more common attributes between the at least one of the plurality of first tasks and the at least one of the plurality of second tasks, the one or more common attributes including at least one of a subject attribute, a user identification attribute, a start date attribute, or an end date attribute, and the operation includes at least one of starting a given task, stopping the given task, or changing a priority of the given task.

6. The computer-implemented method of claim 1, which includes associating the plurality of first tasks and the plurality of second tasks based on one of a hierarchical relation, a constraint relation, and temporal relation.

7. The computer-implemented method of claim 1, wherein the graphical user interface allows a user to create and modify the plurality of first tasks and the plurality of second tasks in different contexts.

8. The computer-implemented method of claim 1, further comprising selectively displaying a workflow representation associated with at least one selected task selected from the plurality of first and the plurality of second tasks.

9. The computer-implemented method of claim 8, wherein associations between different tasks are shown in the workflow representation by lines connecting associated first and second tasks selected from the plurality of first tasks and the plurality of second tasks.

10. The computer-implemented method of claim 8, wherein the plurality of first tasks and the plurality of second tasks include subtasks and selecting a task displayed in the workflow representation provides a further workflow diagram showing associations between the subtasks.

11. The computer-implemented method of claim 8, further comprising:
identifying a priority associated with each task; and
arranging each task in the workflow representation based on the priority associated with each task.

12. The computer-implemented method of claim 11, further comprising allowing a user to drag a task in the workflow representation to at least one different position in the workflow representation to change a priority associated with the task.

13. The computer-implemented method of claim 1, wherein the specified relationship is based on identifying one or more common attributes between the at least one of the plurality of first tasks and the at least one of the plurality of second tasks.

14. The computer-implemented method of claim 1, wherein the operation includes at least one of starting a given task, stopping the given task, or changing a priority of the given task.

15. The computer-implemented method of claim 1, wherein a relationship based on the attributes is used to associate the at least one of the plurality of first tasks with at least one of the plurality of second tasks, the attributes including at least one of a subject attribute, a priority attribute, a start date attribute, or an end date attribute.

16. The computer-implemented method of claim 1, wherein the specified relationship corresponds to a constraint relation so that performing the operation on the at least one of the plurality of first tasks in the first task context results in performing the operation on the at least one of the plurality of second tasks in the second task context.

17. The computer-implemented method of claim 1, wherein the specified relationship includes a relationship mapping between the first context and the second context to associate the at least one of the plurality of first tasks in the first task context with the at least one of the plurality of second tasks in the second task context.

18. A non-transitory machine-readable medium comprising instructions which, when executed by one or more processors, perform operations comprising:
providing a graphical user interface for a user to:
identify a first task context and associate a plurality of first tasks with the first task context, and
identify a second task context and associate a plurality of second tasks with the second task context;
assigning attributes to the plurality of first tasks and the plurality of second tasks;
specifying a relationship that associates at least one of the plurality of first tasks with at least one of the plurality of second tasks based on the attributes, the specified relationship identifying an operation that is associated with each of the at least one of the plurality of first tasks in the first task context and the at least one of the plurality of second tasks in the second task context;
monitoring a user input to perform the operation on the at least one of the plurality of first tasks in the first task context; and
in response to the user input, automatically identifying the at least one of the plurality of second tasks through the specified relationship and performing the operation on the at least one of the plurality of first tasks in the first task context and the at least one of the plurality of second tasks in the second task context.

19. A computer-implemented system to manage a plurality of tasks, the system comprising:
at least one machine to execute:
an interface module to provide a graphical user interface for a user to:
identify a first task context and associate a plurality of first tasks with the first task context, and
identify a second task context and associate a plurality of second tasks with the second task context; and
a processor module to:
assign attributes to the plurality of first tasks and the plurality of second tasks,
specify a relationship that associates at least one of the plurality of first tasks with at least one of the plurality of second tasks based on the attributes, the specified relationship identifying an operation that is associated with each of the at least one of the plurality of first tasks in the first task context and the at least one of the plurality of second tasks in the second task context,
monitor a user input to perform the operation on the at least one of the plurality of first tasks in the first task context, and
in response to the user input, automatically identify the at least one of the plurality of second tasks through the specified relationship and perform the operation on the at least one of the plurality of first tasks in the first task context and the at least one of the plurality of second tasks in the second task context.

20. The computer-implemented system of claim 19, wherein at least one email is associated with at least one of the plurality of first tasks and the plurality of second tasks.

21. The computer-implemented system of claim 19, wherein the plurality of first tasks and the plurality of second tasks are received from a plurality task sources, the plurality task sources including an email source and a task management system.

22. The computer-implemented system of claim 19, the plurality of first tasks and the plurality of second tasks are shared between different software applications.

23. The computer-implemented system of claim 19, further comprising assigning attributes to the plurality of first tasks and the plurality of second tasks and associating the plurality of first tasks and the plurality of second tasks based on the attributes, the attributes including at least one of a subject attribute, a user identification attribute, a start date attribute, and an end date attribute.

24. The computer-implemented system of claim 19, wherein the plurality of first tasks is associated with at least one of the plurality of second tasks based on one or more of the following relations: a hierarchical, a constraint, and temporal.

25. The computer-implemented system of claim 19, wherein the graphical user interface is to allow a user to create and modify the plurality of first tasks and the plurality of second tasks in different contexts.

26. The computer-implemented system of claim 19, further comprising selectively displaying a workflow representation associated with at least one task selected from the plurality of first and the plurality of second tasks.

27. The computer-implemented system of claim 26, wherein associations between different tasks are shown in the workflow representation by lines connecting associated first tasks from the plurality of first tasks and second tasks from the plurality of first tasks.

28. The computer-implemented system of claim 26, wherein the plurality of first tasks and the plurality of second tasks include subtasks and selecting a task displayed in the workflow representation provides a further workflow diagram showing associations between the subtasks.

29. The computer-implemented system of claim 26, wherein a priority associated with each task is identified and tasks in the workflow representation are arranged based on relative priorities of the tasks.

30. The computer-implemented system of claim 29, wherein a user is allowed to drag a task in the workflow representation to at least one different position in the workflow representation to change a priority associated with the task.

31. A computer-implemented system to manage a plurality of tasks, the system comprising:
at least one machine to execute:
means for providing a graphical user interface for a user to:
identify a first task context and associate a plurality of first tasks with the first task context,
identify a second task context and associate a plurality of second tasks with the second task context, and
assign attributes to the plurality of first tasks and the plurality of second tasks; and
means for specifying a relationship that associates at least one of the plurality of first tasks with at least one of the plurality of second tasks based on the attributes, the specified relationship identifying an operation that is associated with each of the at least one of the plurality of first tasks in the first task context and the at least one of the plurality of second tasks in the second task context;
means for monitoring a user input to perform the operation on the at least one of the plurality of first tasks in the first task context; and
means for automatically identifying the at least one of the plurality of second tasks through the specified relationship and performing the operation on the at least one of the plurality of first tasks in the first task context and the at least one of the plurality of second tasks in the second task context in response to the user input.

* * * * *